(12) United States Patent
Lee

(10) Patent No.: US 11,355,805 B2
(45) Date of Patent: Jun. 7, 2022

(54) BATTERY PACK HAVING IMPROVED TEMPERATURE CONTROL PERFORMANCE

(71) Applicant: LG Chem, Ltd., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 223 days.

(21) Appl. No.: 16/477,677

(22) PCT Filed: Jul. 24, 2018

(86) PCT No.: PCT/KR2018/008363
§ 371 (c)(1),
(2) Date: Jul. 12, 2019

(87) PCT Pub. No.: WO2019/035571
PCT Pub. Date: Feb. 21, 2019

(65) Prior Publication Data
US 2019/0363321 A1 Nov. 28, 2019

(30) Foreign Application Priority Data
Aug. 14, 2017 (KR) .................. 10-2017-0103091

(51) Int. Cl.
*H01M 50/20* (2021.01)
*H01M 10/613* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC ......... H01M 10/6552; H01M 10/6569; H01M 10/659; H01M 10/617
See application file for complete search history.

(56) References Cited

U.S. PATENT DOCUMENTS

| | | | |
|---|---|---|---|
| 2002/0030468 A1* | 3/2002 | Inui ................... | H01M 10/6561 320/112 |
| 2010/0136404 A1* | 6/2010 | Hermann .......... | H01M 10/6557 429/120 |

(Continued)

FOREIGN PATENT DOCUMENTS

| CN | 102868005 A | 1/2013 |
|---|---|---|
| CN | 105789733 A | 7/2016 |

(Continued)

OTHER PUBLICATIONS

Extended European Search Repent dated Apr. 24, 2020 for European Application No. 18846189.1.

*Primary Examiner* — Robert S Carrico
(74) *Attorney, Agent, or Firm* — Birch, Stewart, Kolasch & Birch, LLP

(57) ABSTRACT

Provided is a battery pack having an improved temperature control performance. The battery pack includes a plurality of battery modules including at least one secondary battery therein and spaced apart from each other by a predetermined distance, and a bridge member including a heat conductive material and configured to receive heat generated from at least one battery module by being disposed in contact with at least two battery modules among the plurality of battery modules.

18 Claims, 18 Drawing Sheets

(51) Int. Cl.
  *H01M 10/625* (2014.01)
  *H01M 10/6554* (2014.01)
  *H01M 10/6552* (2014.01)

(52) U.S. Cl.
  CPC ... *H01M 10/6552* (2015.04); *H01M 10/6554* (2015.04); *H01M 2220/20* (2013.01)

(56) References Cited

U.S. PATENT DOCUMENTS

| | | | |
|---|---|---|---|
| 2011/0151301 A1 | 6/2011 | Kim | |
| 2011/0293986 A1 | 12/2011 | Kozu | |
| 2012/0009457 A1* | 1/2012 | Lee | H01M 10/6555 429/120 |
| 2012/0107663 A1* | 5/2012 | Burgers | H01M 10/647 429/120 |
| 2012/0301763 A1 | 11/2012 | Tonomura et al. | |
| 2013/0130074 A1* | 5/2013 | Timmons | B60L 58/27 429/62 |
| 2013/0164576 A1 | 6/2013 | Cha et al. | |
| 2017/0365887 A1* | 12/2017 | Kwon | H01M 10/48 |
| 2018/0138561 A1 | 5/2018 | Lee et al. | |

FOREIGN PATENT DOCUMENTS

| | | |
|---|---|---|
| CN | 106129526 A | 11/2016 |
| EP | 1169294 A2 | 3/2002 |
| EP | 2 325 923 A1 | 5/2011 |
| JP | 2000-58016 A | 2/2000 |
| JP | 2003-77440 A | 3/2003 |
| KR | 10-2014-0034413 A | 3/2014 |
| KR | 10-1449103 B1 | 10/2014 |
| KR | 10-1688484 B1 | 12/2016 |
| KR | 10-1690575 B1 | 12/2016 |
| KR | 10-2017-0022741 A | 3/2017 |
| KR | 10-2017-0051024 A | 5/2017 |
| KR | 10-1761161 B1 | 8/2017 |
| WO | 2015/130746 A1 | 9/2015 |

* cited by examiner

BATTERY PACK HAVING IMPROVED TEMPERATURE CONTROL PERFORMANCE

CROSS-REFERENCES TO RELATED APPLICATIONS

This application is a U.S. national phase application, pursuant to 35 U.S.C. § 371, of PCT/KR2018/008363, filed Jul. 24, 2018, designating the U.S., which claims priority to Korean Application No. 10-2017-0103091, filed Aug. 14, 2017. The entire contents of the aforementioned patent applications are incorporated herein by this reference.

TECHNICAL FIELD

The present disclosure relates to a battery pack including at least one battery module, and more particularly, to a battery pack having an improved temperature control performance and a vehicle including the same.

BACKGROUND ART

Currently commercialized secondary batteries include nickel cadmium batteries, nickel hydrogen batteries, nickel zinc batteries, lithium secondary batteries, and the like, and the lithium secondary batteries thereamong are receiving attention due to advantages of versatile charging/discharging, a significantly low self-discharge rate, and high energy density since a memory effect is barely generated compared to nickel-based secondary batteries.

Such a lithium secondary battery mainly uses a lithium-based oxide and a carbon material as a positive electrode active material and a negative electrode active material, respectively. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery case, that seals and accommodates the electrode assembly with an electrolyte solution.

Generally, the lithium secondary battery may be classified into a can-type secondary battery, in which the electrode assembly is accommodated in a metal can, and a pouch-type secondary battery, in which the electrode assembly is accommodated in a pouch of an aluminum laminate sheet.

Recently, the secondary battery is widely used not only in a small-sized apparatus, such as a portable electronic device, but also in medium to large-sized apparatuses, such as a vehicle or an energy storage system (ESS), for driving or storing energy. The secondary battery is mounted on the medium to large-sized apparatuses, or the like by being included in a battery pack, and in order to increase capacity and output of the battery pack, a large number of secondary batteries are included in the battery pack and electrically connected to each other. The plurality of secondary batteries may configure one battery module by being accommodated in one module case, and the plurality of battery modules may configure one battery pack by being accommodated in one pack case.

Generally, when a secondary battery is used in an environment where temperature is higher than an appropriate temperature, performance may deteriorate and, in severe cases, may pose a risk of explosion or ignition. Moreover, when a battery pack is configured using a plurality of secondary batteries, heat emitted from the plurality of secondary batteries in a small space may be accumulated and thus the temperature of the battery pack may be increased faster and excessively. In particular, a battery pack for a vehicle, a battery pack for an ESS, or the like, which is mainly used outdoors, may be frequently exposed to the direct sunlight and may be placed in a severe high temperature condition, found during a summertime, in a desert region, or the like. Accordingly, in the battery pack, it is significantly important to control the temperature, in particular, to cool the battery pack when the temperature of the battery pack is increased.

Furthermore, an abnormal situation may occur, and thus heat may be generated in some battery modules among a plurality of battery modules included in a battery pack or in some secondary batteries among a plurality of secondary batteries included in a battery pack. Such heat may constantly raise the temperature of a battery, and when a certain threshold temperature is exceeded, a thermal runaway may occur. If such heat generation or thermal runaway is not properly controlled, safety of the battery pack is not properly secured.

DISCLOSURE

Technical Problem

The present disclosure is designed to solve the problems of the related art, and therefore the present disclosure is directed to providing a battery pack, in which safety is improved by effectively controlling heat generation or a thermal runaway, and a vehicle including the battery pack.

These and other objects and advantages of the present disclosure may be understood from the following detailed description and will become more fully apparent from the exemplary embodiments of the present disclosure. Further, it will be easily understood that the objects and advantages of the present disclosure may be realized by the means shown in the appended claims and combinations thereof.

Technical Solution

The present disclosure for accomplishing the above objects may representatively have following configurations.

(1) A battery pack including a plurality of battery modules including at least one secondary battery therein and spaced apart from each other by a predetermined distance, and a bridge member including a heat conductive material and configured to receive heat generated from at least one battery module by being disposed in contact with at least two battery modules among the plurality of battery modules.

(2) The battery pack of (1), wherein the bridge member may transfer the heat generated from the at least one battery module to an adjacent battery module through the heat conductive material.

(3) The battery pack of (1) or (2), wherein the bridge member may include at least two bridge members that are disposed between two battery modules while being spaced apart from each other in a direction orthogonal to a stacking direction of the plurality of battery modules.

(4) The battery pack of any one of (1) through (3), wherein the bridge member may include an adhesive material at both ends thereof to be adhesively fixed to an outer surface of the plurality of battery modules.

(5) The battery pack of any one of (1) through (4), wherein each of the plurality of battery modules may include, at a region where the bridge member is contacted, a bridge mounting portion configured to support the bridge member in an upward direction (6) The battery pack of any one of (1) through (5), wherein the bridge member may include a heat absorbing material and be configured to absorb and store the heat generated from the at least one battery module.

(7) The battery pack of (6), wherein the bridge member may include an internal space and contain the heat absorbing material in the internal space.

(8) The battery pack of (6) or (7), wherein the bridge member may allow replenishing or withdrawal of the heat absorbing material provided in the internal space.

(9) The battery pack of any one of (1) through (8), wherein the plurality of battery modules may be arranged in a horizontal direction, and the bridge member may be disposed at an upper corner portion of the plurality of battery modules.

(10) The battery pack of any one of (1) through (9), wherein the bridge member may be detachable from the plurality of battery modules.

(11) The battery pack of any one of (1) through (10), wherein the bridge member may be configured to allow a coupling location with respect to an outer surface of the plurality of battery modules to be changeable.

(12) The battery pack of any one of (1) through (11), wherein the plurality of battery modules and the bridge member may include a protrusion and a recess formed in mutually corresponding shapes at regions that contact each other.

(13) The battery pack of any one of (1) through (12), wherein the bridge member may be configured in a shape in which both end portions that contact two battery modules are extended.

(14) The battery pack of any one of (1) through (13), wherein a plurality of bridge members may be mounted on the at least one battery module, and the at least one battery module may further include a heat transfer member configured to transfer heat between the plurality of bridge members.

(15) A vehicle including the battery pack of any one of (1) through (14).

Advantageous Effects

According to an aspect of the present disclosure, temperature of a battery pack can be effectively controlled.

In particular, according to an embodiment of the present disclosure, even when an abnormal situation occurs, and thus heat is generated in some secondary batteries or some battery modules included in a battery pack, the heat may be quickly distributed or stored, thereby preventing thermal runaway of the secondary battery or battery module.

Thus, according to the aspect of the present disclosure, safety of the battery pack can be further improved.

Additionally, according to an aspect of the present disclosure, mechanical rigidity of the battery pack can be increased.

BRIEF DESCRIPTION OF THE DRAWINGS

The accompanying drawings illustrate a preferred embodiment of the present disclosure and together with the following disclosure, serve to provide further understanding of the technical features of the present disclosure, and thus, the present disclosure should not be construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is merely a preferable example for the purpose of illustrations only, not intended to limit the scope of the disclosure, and thus, it should be understood that other equivalents and modifications could be made thereto without departing from the scope of the disclosure.

Figure 1:
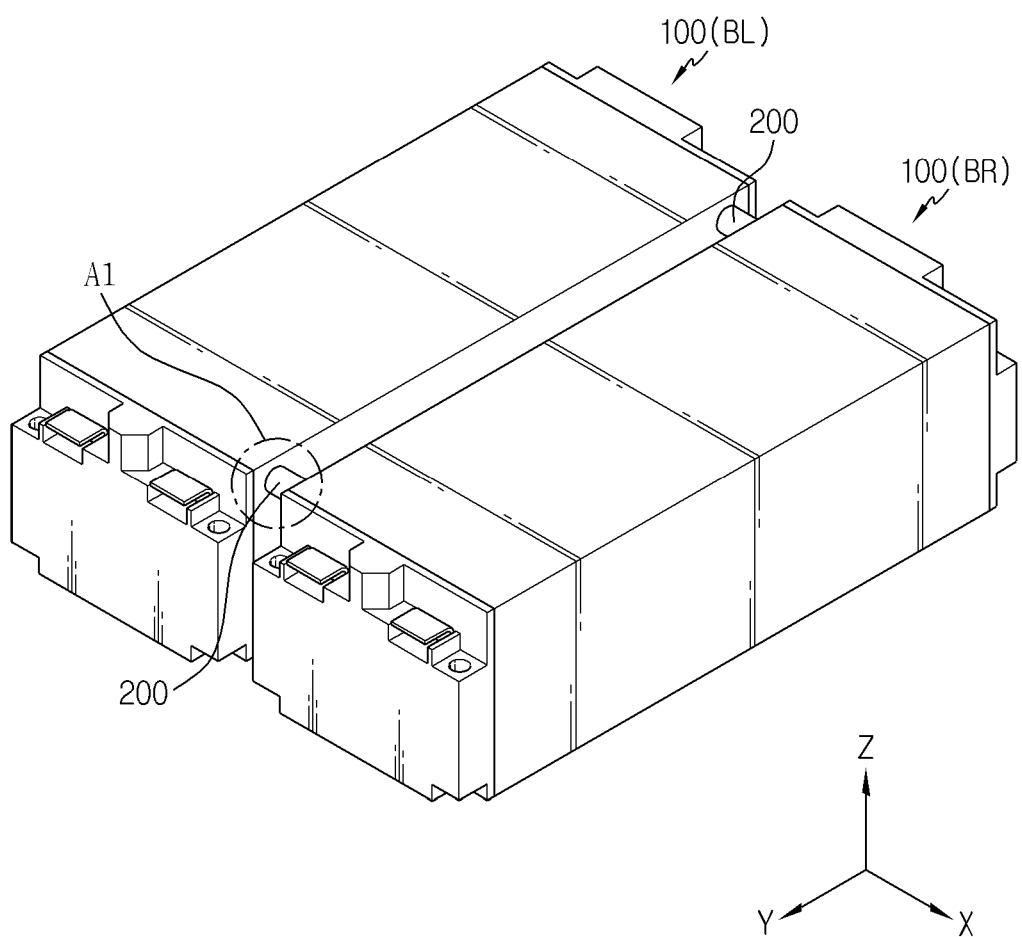
FIG. 1 is a perspective view schematically showing a partial configuration of a battery pack, according to an embodiment of the present disclosure.

FIG. 1 is a perspective view schematically showing a partial configuration of a battery pack, according to an embodiment of the present disclosure.

Referring to FIG. 1, the battery pack according to the present disclosure may include a battery module 100 and a bridge member 200.

The battery module 100 may include at least one secondary battery therein. In particular, the secondary battery may be a pouch type secondary battery, but the present disclosure is not necessarily limited by the configuration of the secondary battery.

The secondary battery may include an electrode assembly, an electrolyte solution, and an exterior material. The electrode assembly is an assembly of an electrode and a separation film, and may be configured in a shape in which at least one positive electrode plate and at least one negative electrode plate are arranged with a separation film therebetween. Further, an electrode tab may be provided for each electrode plate of the electrode assembly to be connected to an electrode lead. In particular, in a pouch type secondary battery, at least one electrode tab may be connected to an electrode lead, and the electrode lead may have one end exposed to the exterior by being disposed between pouch exterior materials to function as an electrode terminal. The exterior material may accommodate the electrode assembly and the electrolyte solution by including an internal space, and may be sealed. The exterior material may include a metallic material in case of a can type secondary battery, and may include an outer insulating layer, a metal layer, and an inner adhesive layer in case of a pouch type secondary battery.

Since such a configuration of the secondary battery is obvious to one of ordinary skill in the art, detailed descriptions thereof are omitted. Further, the battery pack according to the present disclosure may employ various secondary batteries well-known at the time of filing of the present disclosure.

The battery module 100 may include a module case to accommodate the secondary battery. In other words, it may be said that the module case forms an outer region or outer surface of the battery module 100, and at least one secondary battery may be accommodated inside the module case. In particular, when the battery module 100 includes a plurality of secondary batteries, the plurality of secondary batteries may be stacked in at least one direction. When the secondary batteries included in the battery module 100 are pouch type secondary batteries, the battery module 100 may further include a plurality of stacking cartridges that are stackable on each other and provided with a frame at an edge of each of the pouch type secondary batteries, to facilitate stacking of the pouch type secondary batteries while improving fixability.

As shown in FIG. 1, the module case may have an approximately rectangular parallelepiped shape. In this case, the module case may include a top portion, a bottom portion, a left portion, a right portion, a front portion, and a rear portion. Further, a module terminal may be provided in at least one of the front portion and the rear portion of the module case. The module case may include a main body portion whose front portion and/or rear portion is opened, and inner portion is hollow, to accommodate a secondary battery; a front cover that covers the front portion; and a rear cover that covers the rear portion. Alternatively, the module case may include a main body portion whose top portion is opened and formed in a box shape to accommodate a secondary battery in an internal space, and an upper cover that seals the opened top portion. In addition, the module case may be configured in other various forms.

The module case may be sealed to protect the secondary battery accommodated therein from external physical and chemical factors, or the like. For example, as shown in FIG. 1, the module case may be closed from all of top, bottom, left, right, front, and back to prevent a top portion, a bottom portion, a left portion, a right portion, a front portion, and a rear portion of the secondary battery accommodated therein from being exposed to the exterior. According to such a configuration, the module case may become a component that forms an outer region with respect to one battery module, and thus may become a boundary that defines the outside and the inside of the battery module 100.

The module case may include an electric insulating material, such as plastic, to secure electric insulation for the outside and inside of the battery module 100. Additionally or alternatively, the module case may be formed of other various materials or further include another material.

The plurality of secondary batteries included in the battery module 100 may be electrically connected to each other in series and/or in parallel. Module terminals (a positive (+) terminal and a negative (−) terminal) may be provided outside the module case of the battery module 100, for example, on an upper front portion of the module case, and electrically connected to the secondary batteries inside the battery module 100. Such a module terminal may be connected to a bus bar for an interconnection between the battery modules 100 or connection with an apparatus outside the battery module 100.

A plurality of the battery modules 100 may be included in a battery pack. The plurality of battery modules 100 may be arranged in a left-and-right direction while side surfaces face each other. For example, as shown in FIG. 1, the battery pack may include at least two battery modules 100. The two battery modules 100 may be arranged in the left-and-right direction to allow a left surface and a right surface thereof to face each other.

A side surface of the battery module 100 may indicate, when the battery module 100 has an approximate hexahedron shape, at least some surfaces among four surfaces disposed at side portions excluding a top surface and a bottom surface. In particular, for convenience of description, among the four surfaces disposed at side portions, two relatively wide surfaces are referred to as side surfaces and two relatively narrow surfaces are referred to as a front surface and a rear surface, unless otherwise stated. For example, as shown in FIG. 1, when the two battery modules 100 are arranged in the left-and-right direction to allow wide side surfaces to face each other, two surfaces of the battery modules 100 that face each other in an X-axis direction are referred to as side surfaces, i.e., a left surface and a right surface. Two surfaces of the battery modules 100 that face each other in a Y-axis direction, namely in the front-and-rear direction, are referred to as a front surface and a rear surface.

In the present disclosure, unless otherwise stated, an X-axis direction of FIG. 1 may be a left-and-right direction, a Y-axis direction may be a front-and-back direction, and a Z-axis direction may be a top-and-bottom direction. Accordingly, the battery module 100 of FIG. 1 may be formed in a rectangular parallelepiped shape in which a length in the front-and-back direction is longer than a length in the left-and-right direction. The plurality of battery modules 100 may be arranged in parallel in the left-and-right direction to allow left and right surfaces to face each other.

The battery modules 100 may be spaced apart from each other by a predetermined distance. For example, as shown in FIG. 1, the two battery modules 100 may be spaced apart from each other in a horizontal direction (the left-and-right direction) to allow a space to be formed between a left battery module BL and a right battery module BR. In other words, the battery modules 100 may be configured such that the side surfaces, i.e., the left surface and the right surface, are spaced apart from each other by a predetermined distance. Further, the battery pack may be configured such that the space between the side surfaces is substantially empty.

According to the configuration of the present disclosure, a swelling space of the battery module 100 may be secured due to the space between the battery modules 100. In other words, when the battery pack is continuously used, a swelling phenomenon may occur in the secondary battery (cell) included in the battery module 100, and a portion of the battery module 100 may expand due to the swelling phenomenon of a cell. The space between the battery modules 100 may buffer the expansion, thereby preventing a distortion of an overall structure of the battery pack or a damage to a component of the battery pack. Further, the space between the battery modules 100 may serve as a tolerance to facilitate assembly of the battery pack. The space between the battery modules 100 may also function as a buffer space to prevent vibration or an impact from being transferred between the battery modules 100 when vibration or a side impact is applied to the battery pack.

The bridge member 200 may be disposed between the at least two battery modules 100 among the plurality of battery modules 100 included in the battery pack. In other words, the bridge member 200 may be inserted into the space between the battery modules 100. In particular, the bridge member 200 may be disposed between all battery modules 100 included in the battery pack. For example, when the battery pack includes six battery modules 100 and the six battery modules 100 are arranged in the left-and-right direction, at least five bridge members 200 may be provided such that at least one bridge member 200 is disposed between the battery modules 100.

The bridge member 200 may be disposed between the plurality of battery modules 100 while contacting the battery modules 100. In other words, the bridge member 200 may be disposed between the battery modules 100 while at least two portions, for example, both ends, contact different adjacent battery modules 100. For example, the bridge member 200 may be disposed between the two battery modules 100 that are arranged in the left-and-right direction, while a left end portion contacts the left battery module BL and a right end portion contacts the right battery module BR.

Further, the bridge member 200 may be configured to transfer heat generated from the at least one battery module 100. In other words, the bridge member 200 may receive heat from the battery module 100 that contacts at least one side. Accordingly, the bridge member 200 may include a heat conductive material. For example, the bridge member 200 may include a heat conductive material in at least a portion that contacts the battery module 100. In this case, when heat is generated from the battery module 100, the generated heat may be transferred to the bridge member 200 through the heat conductive material provided at the contacting portion.

Preferably, the bridge member 200 may be configured to transfer the heat generated from the at least one battery module 100 to the adjacent battery module 100. This is described in detail with reference to FIG. 2.

Figure 2:
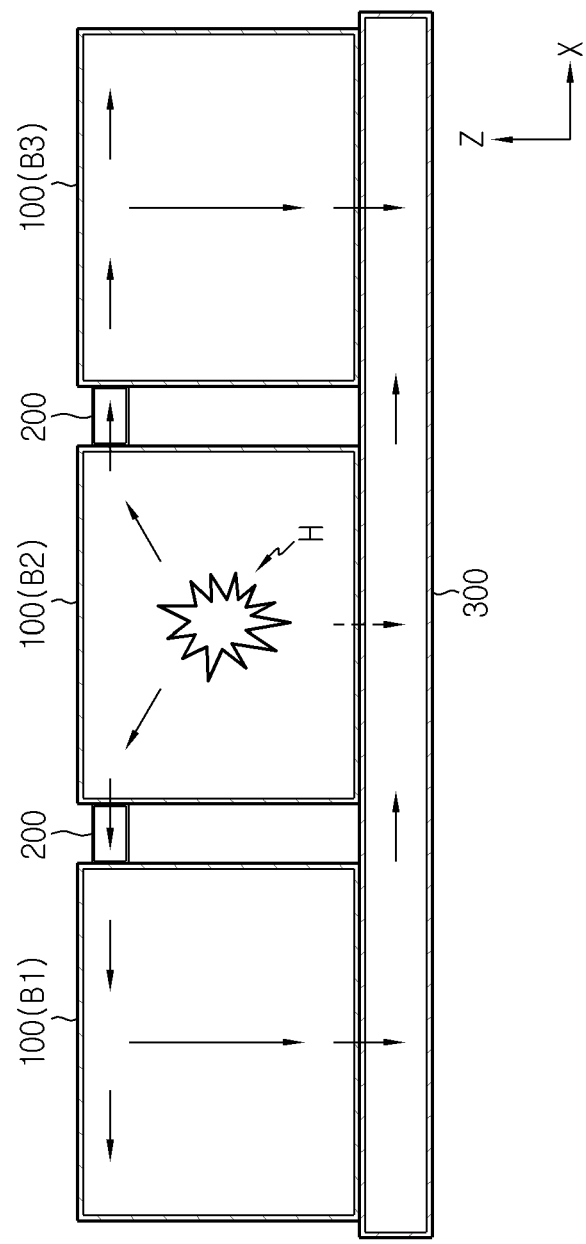
FIG. 2 is a front view schematically illustrating the flow of heat in a configuration of a battery pack, according to an embodiment of the present disclosure.

FIG. 2 is a front view schematically illustrating the flow of heat in a configuration of a battery pack, according to an embodiment of the present disclosure.

Referring to FIG. 2, the battery pack may include the plurality of battery modules 100 arranged in the left-and-right direction, and a heat sink 300 may be provided below the plurality of battery modules 100. Further, a refrigerant, such as coolant or air, may flow while in contact with the heat sink 300. For example, as shown in the configuration of FIG. 2, the heat sink 300 may be configured to allow a cooling fluid to flow in a direction from left to right.

According to the configuration of FIG. 2, bridge members 200 may be disposed between all of the plurality of battery modules 100 included in the battery pack. Further, both ends, i.e., the left end portion and the right end portion of each of the bridge member 200 may contact different battery modules 100. For convenience of description, the three battery modules 100 will be respectively referred to as a first battery module B1, a second battery module B2, and a third battery module B3 in a direction from left to right.

As indicated by an arrow H in FIG. 2, when heat is abnormally generated in the second battery module B2, the generated heat may be transferred to the heat sink 300 and the bridge member 200. The heat (indicated by a dashed arrow) transmitted to the heat sink 300 may be discharged outside the battery pack by the refrigerant. The heat transferred to the bridge member 200 may be transferred subsequently to an adjacent battery module. In other words, heat generated in any one battery module may be conducted to another adjacent battery module through the bridge member 200, as indicated by solid arrows in the drawing. In this case, the first battery module B1 and the third battery module B3 that receive the heat through the bridge member 200 may distribute and accommodate the heat, transfer the heat to another battery module, or discharge the heat to the heat sink 300 disposed therebelow.

In particular, the bridge member 200 may transfer heat of some battery modules 100 to other battery modules 100 through the heat conductive material. In this regard, the bridge member 200 may include the heat conductive material in a form that is elongated continuously from one end to another end. In this case, heat generated in some battery modules 100 may be transferred to other battery modules 100 through the heat conductive material of the bridge member 200.

According to the configuration of the present disclosure, a cooling performance of the battery pack may be further improved. In other words, according to the configuration, the bridge member 200 and the heat sink 300 may both absorb or discharge heat of the battery module 100, and thus a cooling performance may be further improved compared to the battery module 100 that includes only the heat sink 300.

In detail, in the above configuration, when the temperature of the second battery module B2 is increased higher than other battery modules, heat of the second battery module B2 may flow in a downward direction and be transferred to the heat sink 300 (indicated by the dashed arrow). Moreover, in the above configuration, the heat of the second battery module B2 may flow in an upward direction through the bridge member 200 and be distributed to the first battery module B1 and the third battery module B3 (indicated by the solid arrow). Subsequently, the heat distributed to the first battery module B1 and the third battery module B3 may be accommodated therein or transferred to the heat sink 300 therebelow. Thus, in this case, the heat generated in the second battery module B2 may be quickly transferred and distributed, and thus a rapid increase in the temperature or a thermal runaway of the second battery module B2 may be effectively prevented.

Meanwhile, in FIG. 2, three battery modules 100 and two bridge members 200 are illustrated, but the present disclosure is not limited by a specific number of the battery module 100 or bridge member 200.

The bridge member 200 may include a metallic material. For example, the bridge member 200 may have a bar shape made of a metallic material.

Accordingly, when the bridge member 200 includes a metallic material, the bridge member 200 may have excellent heat conduction, and thus may be able to satisfactorily absorb and transfer heat between the battery modules 100. For example, the bridge member 200 may include an aluminum material to satisfactorily absorb and transfer heat from the contacting battery module 100.

Moreover, when the bridge member 200 includes a metallic material, rigidity may be improved, and thus may not only maintain the shape thereof, but also prevent overall shape deformation of the battery pack. In addition, the bridge member 200 may be disposed between the battery modules 100 to maintain the space between the battery modules 100. For example, the bridge member 200 may include a steel material. In this case, the space between the battery modules 100 may be stably maintained by the bridge member 200. In other words, the space between the battery modules 100 may be maintained by the bridge member 200, and thus the battery module 100 may be prevented from being damaged by external vibration or impact, and the swelling space between the battery modules 100 may be secured.

The battery pack may include at least one bridge member 200. In particular, when the battery pack includes at least three battery modules 100, the battery pack may include at least two bridge members 200 each disposed between the battery modules 100.

Further, at least two bridge members 200 may be disposed between the two battery modules 100. For example, as shown in FIG. 1, at least two bridge members 200 may be inserted between the left battery module BL and the second battery module BR. In this case, the plurality of bridge members 200 disposed in the same space between the battery modules 100 may be spaced apart from each other by a predetermined distance. In particular, a separated direction of the two bridge members 200 disposed between the two battery modules 100 may be a direction orthogonal to a stacking direction of the two battery modules 100. For example, in the configuration of FIG. 1, the stacking direction of the two battery modules 100 is the X-axis direction, and the separated direction of the two bridge members 200 disposed therebetween is the Y-axis direction. Alternatively, in the configuration of FIG. 1, the two bridge members 200 may be spaced apart from each other by a predetermined distance in the Z-axis direction.

Accordingly, it may be said that the two bridge members 200 disposed between the two battery modules 100 are spaced apart from each other by a predetermined distance on a plane orthogonal to the stacking direction of the two battery modules 100. For example, as shown in the configuration of FIG. 1, between the two battery modules BL and BR, a bridge member 200 may be provided at an upper corner of the front side of the battery modules and another bridge member 200 may be provided at an upper corner of the rear side of the battery modules.

According to the configuration of the present disclosure, the space between the two battery modules 100 may be satisfactorily maintained by the bridge member 200 without having to increase the volume of the bridge member 200. Moreover, according to the configuration, a sufficient space between the two battery modules 100 may be secured by decreasing the size of the bridge member 200. Accordingly, even when the battery module 100 expands due to cell swelling, the expansion of the battery module 100 may be absorbed by the space between the battery modules 100.

Preferably, the bridge member 200 may be configured in a pillar shape. This is described in detail with reference to FIG. 3.

Figure 3:
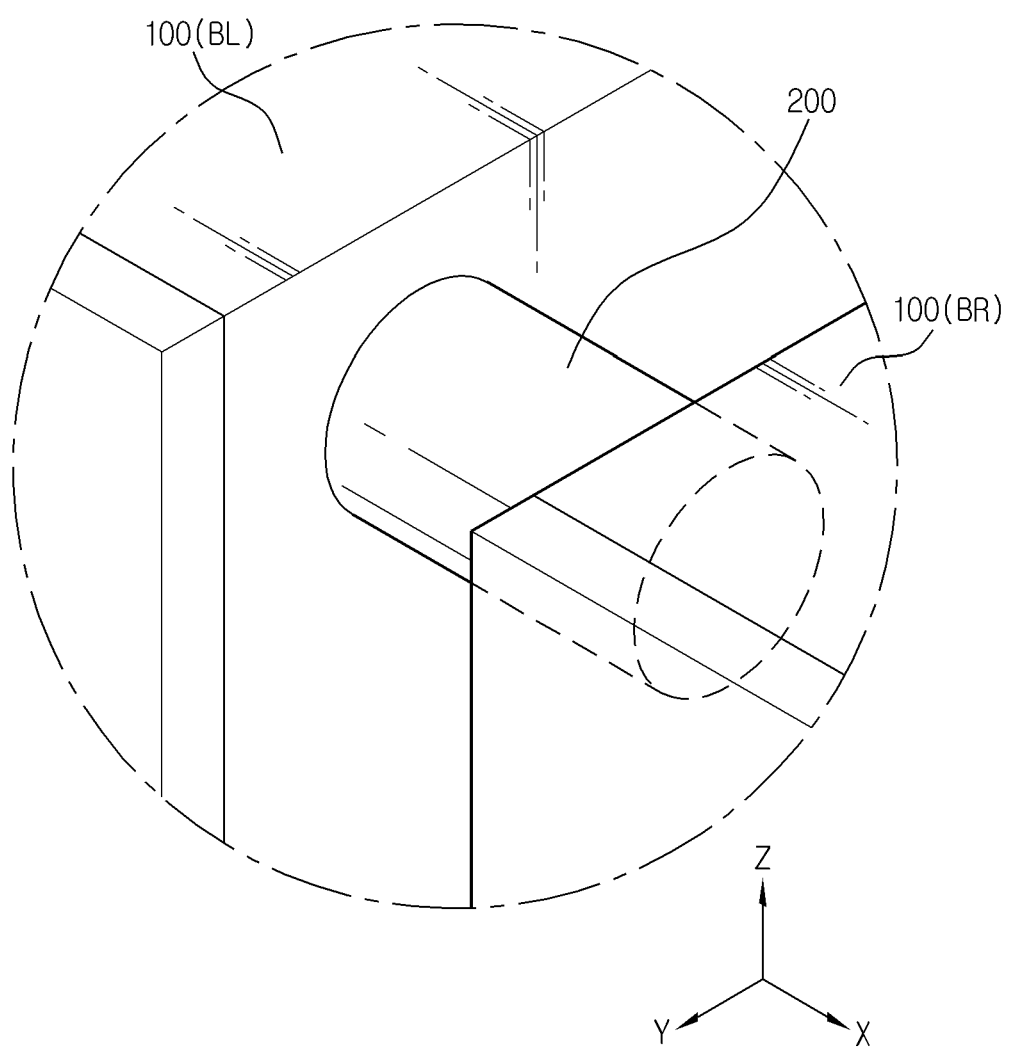
FIG. 3 is a transparent perspective view schematically showing a partial configuration of a battery pack, according to an embodiment of the present disclosure.

FIG. 3 is a transparent perspective view schematically showing a partial configuration of a battery pack, according to an embodiment of the present disclosure. In detail, FIG. 3 is an enlarged configuration of a region A1 of FIG. 1.

Referring to FIG. 3, the bridge member 200 may be configured in a cylindrical shape. In particular, the bridge member 200 may be configured in a solid cylindrical shape. For example, the bridge member 200 may be configured in a metal pillar shape of aluminum or steel. Further, the bridge member 200 may contact different battery modules 100 by including two parallel surfaces, i.e., flat surfaces, respectively at the left and the right. In other words, as shown in the configuration of FIGS. 1 and 3, the bridge member 200 may be disposed between the two battery modules 100 in a horizontally oriented form to allow the flat surfaces to face the left and the right. In this case, the left flat surface of the bridge member 200 may contact the module case of the left battery module BL and the right flat surface may contact the module case of the right battery module BR.

According to the configuration of the present disclosure, since the contacting surface of the bridge member 200 is configured in a flat surface, contact between the bridge member 200 and the battery module 100 may be improved. In other words, a contacting area between the bridge member 200 and the battery module 100 may be increased, and contacting thermal resistance may be reduced. Accordingly, a heat transfer performance between the bridge member 200 and the battery module 100 may be improved.

Meanwhile, in the configuration of FIG. 3, the bridge member 200 is illustrated in the cylindrical shape, but the bridge member 200 may be configured in a polygonal pillar shape. For example, the bridge member 200 may be configured in the shape such as a square pillar shape, a triangular pillar shape, a pentagonal pillar shape, a hexagonal pillar shape, or an octagonal pillar shape. When the bridge member 200 is configured in a polygonal pillar shape, the bridge member 200 may be disposed between the two battery modules 100 in a horizontally oriented form to allow the flat surfaces to face both sides. In other words, the bridge member 200 having a polygonal pillar shape may have two flat surfaces respectively on left and right sides to contact different battery modules 100.

The bridge member 200 may be coupled and fixed to the battery module 100. In particular, the bridge member 200 may be fixed to an outer surface of the battery module 100 by an adhesive material. This is described in detail with reference to FIG. 4.

Figure 4:
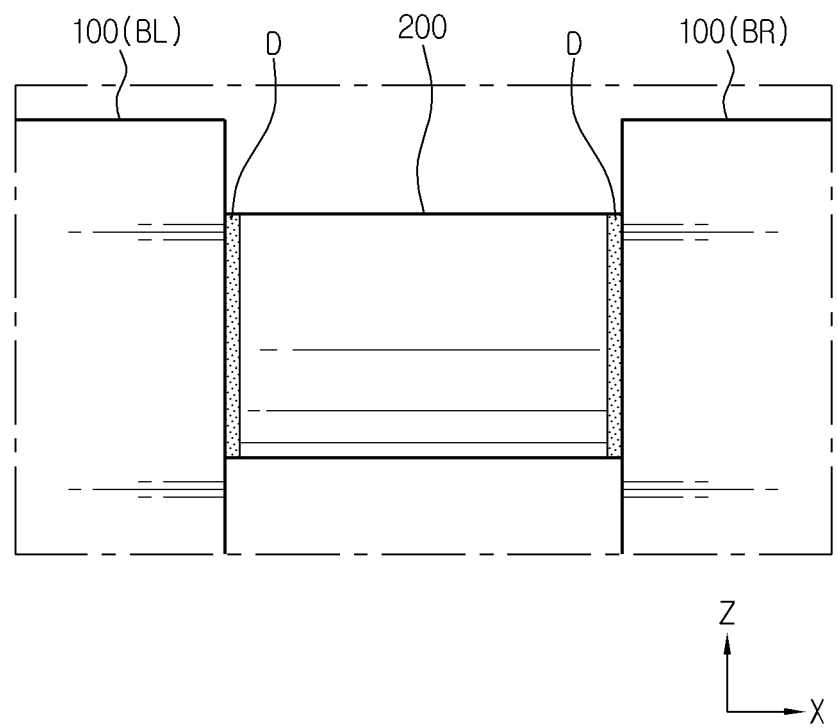
FIG. 4 is a front view schematically showing a configuration of a bridge member, according to an embodiment of the present disclosure.

FIG. 4 is a front view schematically showing a configuration of the bridge member 200, according to an embodiment of the present disclosure. FIG. 4 may be a configuration applied to the region A1 of FIG. 1.

Referring to FIG. 4, the bridge member 200 may include an adhesive material D at both ends. In other words, in the bridge member 200, a left end portion may contact the left battery module BL and a right end portion may contact the right battery module BR, and the adhesive material D may be provided at each of the left end portion and the right end portion. Accordingly, the bridge member 200 may be adhesively fixed to the outer surface of the battery module, in particular, the outer surface of the module case, by the adhesive material D.

The adhesive material D may be configured in a form of an adhesive, such as a glue. Alternatively, the adhesive material D may be configured in a form of an adhesive sheet, such as a double-sided tape with an adhesive provided on both surfaces of a substrate.

According to the configuration of the present disclosure, even when a separate coupling structure is not formed on the battery module 100 or the bridge member 200, the bridge member 200 may be easily coupled and fixed to the battery module 100. According to the configuration of the present disclosure, a process of disposing and fixing the bridge member 200 with respect to the battery module 100 may be easily performed via a method of approaching and adhering the battery module 100 to one end of the bridge member 200 while the other end of the bridge member 200 is adhered to the other battery module 100. Moreover, contact between the bridge member 200 and the battery module 100 may be improved by the adhesive material D, and thus thermal contact resistance may be reduced. In particular, in this case, an air layer between the bridge member 200 and the outer surface of the battery module 100 may be removed or reduced. Accordingly, a heat transfer performance between the battery module 100 and the bridge member 200 may be further improved, and thus a cooling performance of the battery pack may be further improved.

Moreover, the adhesive material D may be a heat conductive adhesive material. For example, the adhesive material D may be heat conductive glue that adheres objects by being hardened from a liquid or gel state.

When the adhesive material D is a heat conductive material, a heat conduction performance between the bridge member 200 and the battery module 100 may be improved. In particular, since the heat conductive adhesive has a high thermal conductivity compared to a general adhesive, the amount and the rate of heat transfer may be further improved between the battery module 100 and the bridge member 200. Thus, in this case, a heat absorption and transfer performance of the battery module 100 through the bridge member 200 may be further improved, and thus a cooling performance of the battery pack may be further improved.

Various heat conductive adhesives may be used for the battery pack according to the present disclosure. For example, the battery pack according to an embodiment of the present disclosure may employ various organic and/or inorganic heat conductive adhesives, such as a heat conductive epoxy adhesive, a heat conductive silicone adhesive, or the like.

The bridge member 200 may include a thermal interface material (TIM). In particular, the bridge member 200 may include the TIM on both end portions that contact the battery module 100. The TIM may be various TIMs well-known at the filing of the present disclosure. Further, the TIM may be configured in various forms, such as gel, pad, or the like.

According to the configuration of the present disclosure, contact thermal resistance between the bridge member 200 and the battery module 100 may be further reduced by the TIM, and thus a heat transfer performance may be further improved, thereby further improving a cooling performance and safety of the battery pack.

Figure 5:
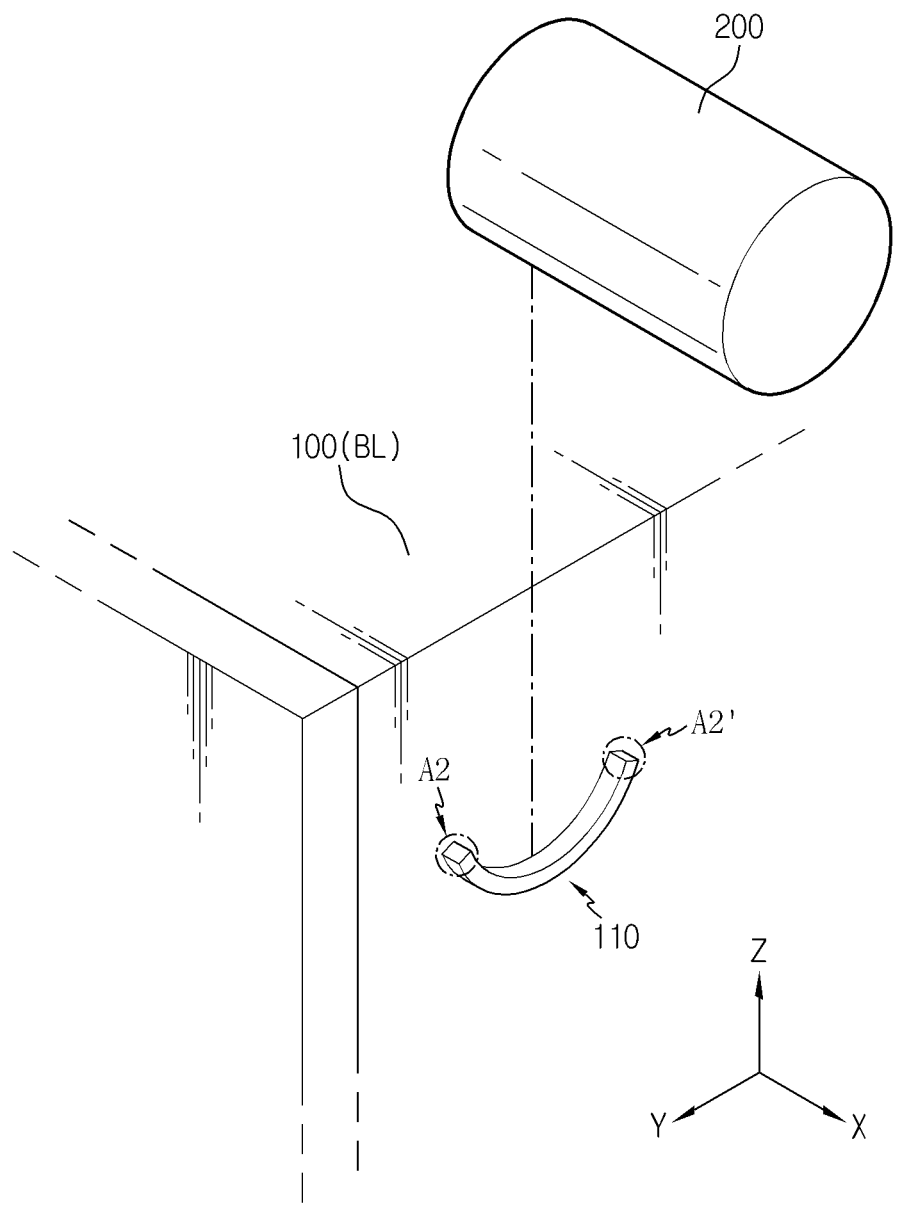
FIG. 5 is a perspective view schematically showing a partial configuration of a battery pack, according to an embodiment of the present disclosure.

FIG. 5 is a perspective view schematically showing a partial configuration of a battery pack, according to an embodiment of the present disclosure. For example, FIG. 5 may be a view showing an embodiment of a coupling configuration of the left battery module BL and the bridge member 200 in the region A1 of FIG. 1.

Referring to FIG. 5, the battery module 100 may include a bridge mounting portion 110 configured to mount the bridge member 200 on a region contacted by the bridge member 200. The bridge mounting portion 110 may protrude in an outward direction from the outer surface of the battery module 100, in particular, from the outer surface of the module case. For example, in the configuration of FIG. 5, the bridge mounting portion 110 may protrude in a direction in which another battery module is located, namely in a right direction (+X-axis direction in the drawing), from a right outer surface of the left battery module BL. The bridge mounting portion 110 may support the bridge member 200 at least in an upward direction. For example, the bridge mounting portion 110 provided on the right outer surface of the left battery module BL may support a left end portion of the bridge member 200 in the upward direction. In other words, the bridge mounting portion 110 may restrict downward movement of the bridge member 200. Although not illustrated, the bridge mounting portion 110 may be provided also on a left outer surface of the right battery module BR. Accordingly, the bridge mounting portion 110 of the right battery module BR may support a right end portion of the bridge member 200 in the upward direction.

Since the bridge mounting portion 110 is a component for mounting the bridge member 200, the bridge mounting portion 110 may have a shape that corresponds to the outer surface of the bridge member 200. For example, when the bridge member 200 is configured in a cylindrical shape, the bridge mounting portion 110 may be formed in a curved shape as shown in FIG. 5, in a shape that corresponds to a bottom surface of the bridge member 200, for example, a rotated 'C' shape.

According to the configuration of the present disclosure, an assembling property, fixability, and heat transfer performance of the bridge member 200 may be further improved. For example, a mounting position of the bridge member 200 may be guided by the configuration of the bridge mounting portion 110. Further, by maintaining the position of the bridge member before being completely adhered by the adhesive material D, the adhesion of the bridge member 200 may be stably performed by the adhesive material D. In particular, the bridge member 200 may be adhered on the outer surface of the battery module 100 while the adhesive material D is coated on the end portion of the bridge member 200 in a liquid or gel state. In this case, the bridge mounting portion 110 may contain the adhesive material D in a proper location between the bridge member 200 and the battery module 100 without flowing out before being hardened, thereby preventing deterioration of fixability of the bridge member 200 due to dislocation of the adhesive material D. Moreover, since the bridge mounting portion 110 supports the bridge member 200 at least in the upward direction separately from the adhesive material D, the fixability of the bridge member 200 may be improved. Further, when the bridge member 200 includes a TIM in a gel sate, the TIM does not flow downward and is contained at the end portion of the bridge member 200, and thus a heat transfer performance by the TIM may be secured.

Moreover, the bridge mounting portion 110 may be configured in a concave shape in a downward direction, as shown in FIG. 5. In other words, the bridge mounting portion 110 in FIG. 5 may be configured such that a front end portion indicated by an arrow A2 and a rear end portion indicated by an arrow A2' may be disposed relatively higher compared to a center portion between the front end portion A2 and the rear end portion A2'.

The shape of FIG. 5 may be resulting from the bridge member 200 having the cylindrical shape, but such a configuration may be applied even when the bridge member 200 has a polygonal pillar shape. For example, a vertical position of a front end portion and a rear end portion may be relatively higher than a vertical position of a center portion in the bridge mounting portion 110, even when the bridge member 200 has a square pillar shape.

According to the configuration of the present disclosure, the adhesive material D or the TIM provided on both ends of the bridge member 200 may not flow down from sides in the space between the bridge member 200 and the battery module 100, but may be contained. For example, when the adhesive material D or the TIM in a liquid or gel state is disposed between the bridge member 200 and the battery module 100, the adhesive material D or the TIM may not easily escape in a forward or backward direction from the space between the bridge member 200 and the battery module 100, but be contained in the internal space. Accordingly, effects of adhesive performance improvement by the adhesive material D or heat transfer performance improvement by the TIM may be secured between the bridge member 200 and the battery module 100.

Meanwhile, in the configuration of FIG. 5, the bridge mounting portion 110 protrudes in an outward direction from the outer surface of the battery module 100, but the present disclosure is not limited by such a configuration.

Figure 6:
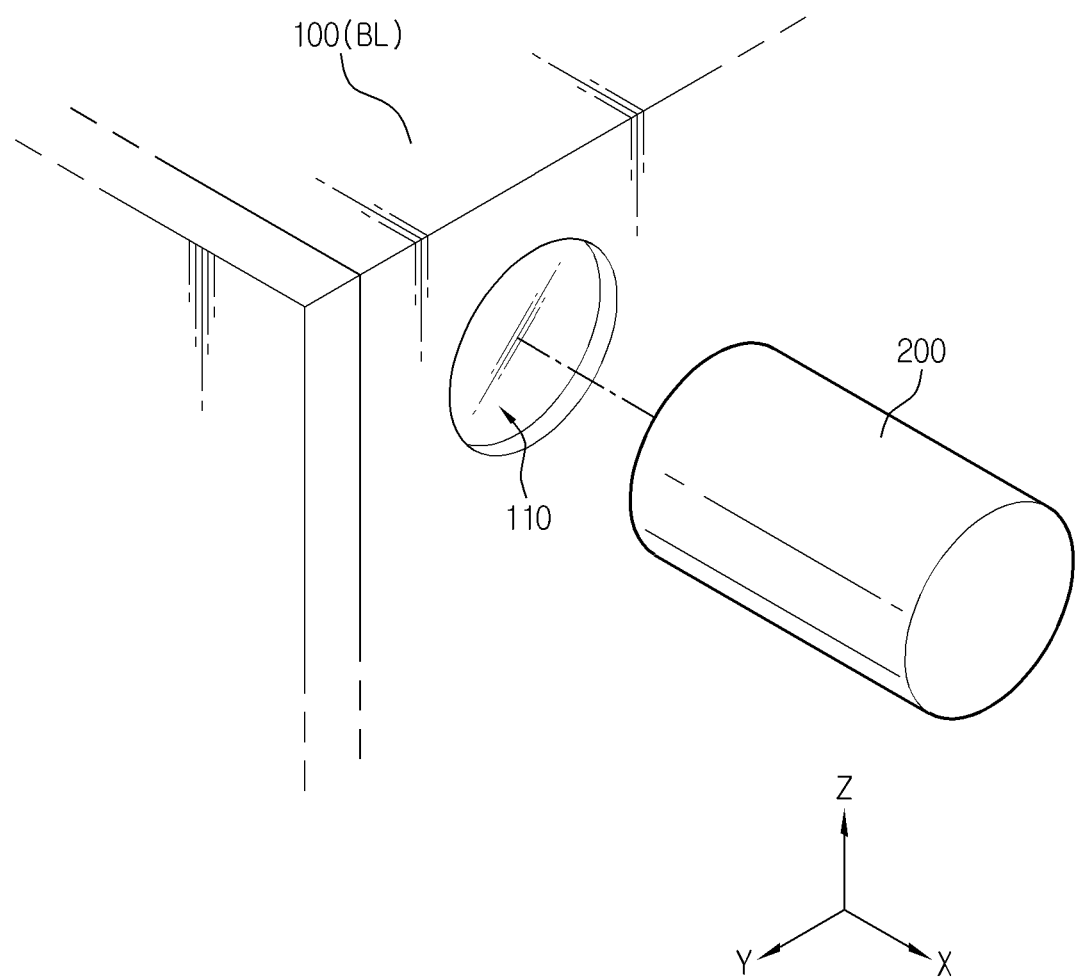
FIG. 6 is a perspective view schematically showing a partial configuration of a battery pack, according to another embodiment of the present disclosure.

FIG. 6 is a perspective view schematically showing a partial configuration of a battery pack, according to another embodiment of the present disclosure. For example, FIG. 6 may be another embodiment of a coupling configuration of the module case of the left battery module BL and the bridge member 200 in the region A1 of FIG. 1.

Referring to FIG. 6, the bridge mounting portion 110 may have a recess shape that is concave in an inward direction from the outer surface of the battery module 100. In other words, the module case of the battery module 100 may include a concave recess in the inward direction, and the recess may function as the bridge mounting portion 110. In this case, the both ends of the bridge member 200 may be inserted into a region concavely formed on the outer surface of the battery module 100, and thus the bridge member 200 may be supported in the upward direction, and the adhesive material D and the TIM may be contained without flowing down. Moreover, when the bridge mounting portion 110 has a recess shape, not only downward direction movement of the bridge member 200, but also movement in other directions, for example, an upward direction (+Z-axis direction) and a front-and-back direction (±Y-axis direction), may be restricted. Thus, the fixability of the bridge member 200 with respect to the battery module 100 may be further improved. In addition, the discharge of the adhesive material D or the TIM disposed between the bridge member 200 and the battery module 100 in the forward and backward direction of the bridge mounting portion 110 may be effectively prevented.

Preferably, the bridge member 200 may be configured to absorb and store heat generated from at least one battery module 100. Accordingly, the bridge member 200 may include a heat absorbing material. This is described in detail with reference to FIGS. 7 and 8.

Figure 7:
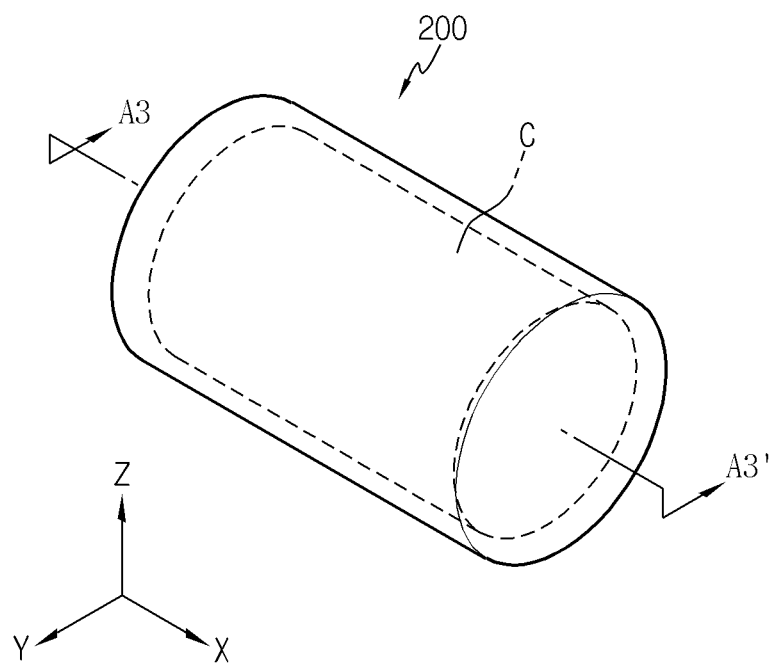
FIG. 7 is a perspective view schematically illustrating a configuration of a bridge member, according to an embodiment of the present disclosure.
Figure 8:
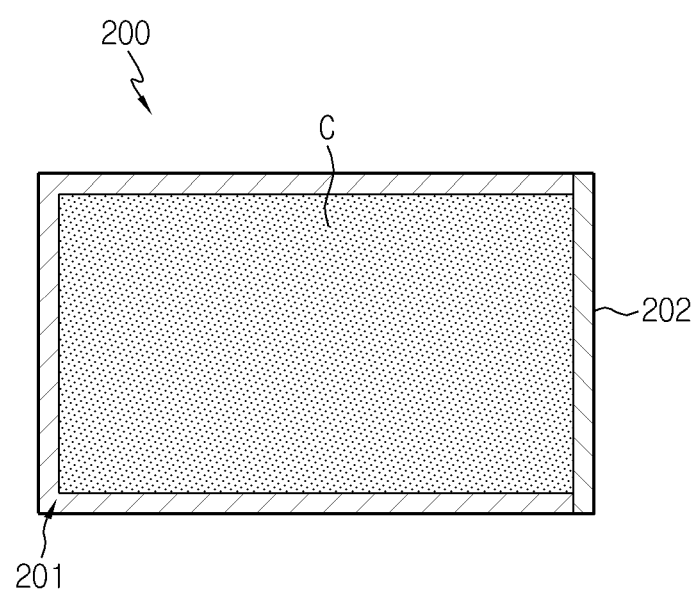
FIG. 8 is a cross-sectional view taken along a line A3-A3' of FIG. 7.

FIG. 7 is a perspective view schematically illustrating a configuration of the bridge member 200, according to an embodiment of the present disclosure. However, for convenience of description, a component included therein is displayed in a dashed line. FIG. 8 is a cross-sectional view taken along a line A3-A3' of FIG. 7.

Referring to FIGS. 7 and 8, the bridge member 200 may include a heat absorbing material C therein. In other words, the bridge member 200 may include an internal space, and may be configured to allow the heat absorbing material C to be filled in the internal space. For example, as shown in FIG. 8, the bridge member 200 may include a main body 201 having an internal space and an opened right surface, and a cover 202 that seals the internal space by being coupled to the opened right end of the main body 201.

In this case, the heat absorbing material C may be inserted into the internal space of the main body 201 through the opened right end, and the cover 202 may be coupled to the opened right end of the main body 201 to cover a right side of the main body 201. In particular, the cover 202 and the main body 201 may be coupled via various methods, such as welding, bonding, screwing, and the like.

In such a configuration, it may be said that the bridge member 200 is configured to allow the internal space to be sealed while the heat absorbing material C is embedded in the internal space. In other words, the heat absorbing material C is contained in the internal space of the bridge member 200 during the use of the battery pack, and the heat absorbing material C does not need to flow into or out of the bridge member 200. Accordingly, the bridge member 200 does not need to include a component for allowing the heat absorbing material C to flow in or out to exchange heat with the battery module 100. Further, the battery pack may not separately need a component for supplying the heat absorbing material C to the bridge member 200 or for discharging or circulating the heat absorbing material C flown out from the bridge member 200.

Accordingly, the bridge member 200 in which the heat absorbing material C is embedded may absorb heat generated from the battery module 100. For example, in the embodiment of FIG. 2, when heat is abnormally generated in the second battery module B2, the generated heat may be transferred to the bridge member 200 attached to the upper left of the second battery module B2 and the bridge member 200 attached to the upper right of the second battery module B2. The left and right bridge members 200 may absorb and store therewithin the heat transferred from the second battery module B2 through the embedded heat absorbing material C. In particular, the heat absorbing material C may be a material in various states, such as a solid state, a liquid state, a gel state, a gas state, and the like.

According to the configuration of the present disclosure, a cooling performance of the battery pack may be further improved due to the heat absorbing material C of the bridge member 200. In other words, when heat is generated from a battery module 100, the heat may be transmitted to and absorbed by the bridge member 200 attached to the battery module 100. In particular, since the bridge member 200 extracts the heat of the battery module 100, the heated battery module 100 may be effectively cooled regardless of the existence, an arranged state, a temperature, or the like of the other battery module 100.

The heat absorbing material C included in the bridge member 200 may employ various materials well-known at the time of filing of the present disclosure, i.e., a material capable of absorbing heat. In particular, the bridge member 200 may include a phase change material (PCM) as the heat absorbing material C. The PCM is a material that can radiate or absorb a large amount heat as a state is changed among a solid state, a liquid state, a gas state, or the like. In other words, the PCM may be a material capable of absorbing or radiating a large amount of heat as the phase is changed at a particular temperature without a temperature change. For example, the PCM is a material that repeats heat absorption and heat radiation based on a phase change, and may be a material having latent heat storage density 50 to 100 times higher than other materials. Since such a PCM is well-known at the time of filing of the present disclosure, detailed descriptions thereof are omitted. For example, the PCM may include an organic material, such as paraffin, fatty acid, or the like, or an inorganic material, such as calcium chloride in a form of a hydrate, or the like.

With respect to the configuration of the bridge member 200 including the heat absorbing material C in the internal space defined by the main body 201 and the cover 202, at least portions of the main body 201 and cover 202 may include a heat conductive material. In such a configuration, since portions that directly contact the battery module 100 are the main body 201 and the cover 202 of the bridge member 200, heat of the battery module 100 may be fluently transferred to the heat absorbing material C therein when at least parts of the main body 201 and the cover 202 are formed of a heat conductive material. For example, the main body 201 and cover 202 of the bridge member 200 may be entirely formed of a metallic material. In detail, the main body 201 of the bridge member 200 may be configured in a hollow pipe shape formed of an aluminum material with an open end, and the cover 202 of the bridge member 200 may be configured in a plate shape formed of an aluminum material.

Figure 9:
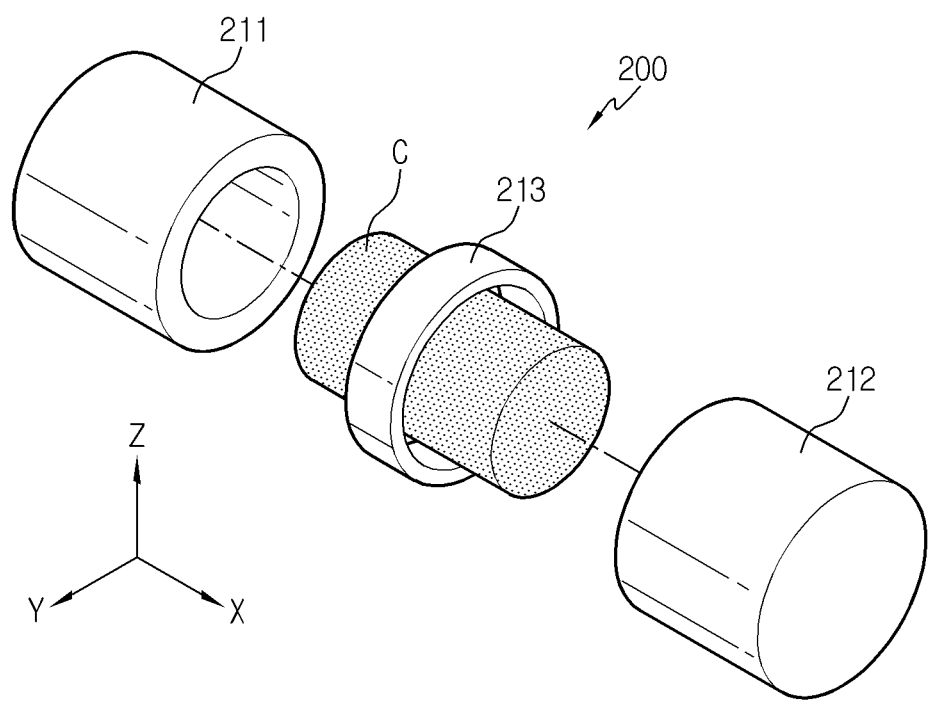
FIG. 9 is an exploded perspective view schematically showing a configuration of a bridge member, according to another embodiment of the present disclosure.

FIG. 9 is an exploded perspective view schematically showing a configuration of the bridge member 200, according to another embodiment of the present disclosure. Hereinafter, details that are different from the above embodiments are mainly described, and details to which the same or similar descriptions as the above embodiments are applicable are omitted.

Referring to FIG. 9, the bridge member 200 may include a heat blocking portion 213. In detail, the bridge member 200 may include a first body portion 211, a second body portion 212, and the heat blocking portion 213. In particular, the first body portion 211 may be disposed at the left of the body of the bridge member 200 to contact the battery module 100 provided at the left. The second body portion 212 may be disposed at the right of the body of the bridge member 200 to contact the battery module 100 provided at the right. In particular, the first body portion 211 and the second body portion 212 may not directly contact each other, but may be spaced apart from each other by a predetermined distance. Further, the heat blocking portion 213 may be disposed between the first body portion 211 and the second body portion 212 to connect the first body portion 211 and the second body portion 212 to each other. In other words, the heat blocking portion 213 may block heat transfer paths between the first and second body portions 211 and 212, thereby preventing heat from directly conducted between the first and second body portions 211 and 212.

The heat blocking portion 213 may be formed of a material that has a low thermal conductivity compared to other parts or has substantially no thermal conductivity. In other words, the heat blocking portion 213 may be formed of a material that has no thermal conductivity or a lower thermal conductivity than the first and second body portions 211 and 212. For example, the first and second body portions 211 and 212 may be formed of a material having a high thermal conductivity, such as steel, while the heat blocking portion 213 may be formed of a material having a low thermal conductivity, such as plastic.

In addition to such a configuration, the bridge member 200 may include the heat absorbing material C therein. For example, the first and second body portions 211 and 212 may be configured in a pipe shape having a central cavity, in which facing side end portions of the central cavity are opened, and an opposite end portion is closed. For example, in the configuration of FIG. 9, the first body portion 211 may have a central cavity in a left-and-right direction, wherein a right end portion of the central cavity is opened and a left end portion of the central cavity is closed. Further, the heat blocking portion 213 may have a ring shape having a central aperture, in which both ends of the central aperture are opened. In this case, heat transferred to the first body portion 211 or heat transferred to the second body portion 212 may be transferred to the heat absorbing material C, and the heat absorbing material C may absorb and store the transferred heat.

According to the configuration of the present disclosure, heat may not be easily transferred from one end to the other end of the bridge member 200. In other words, heat of the first body portion 211 may not be directly transferred to the second body portion 212, and heat of the second body portion 212 may not be directly transferred to the first body portion 211 either, due to the heat blocking portion 213. Accordingly, in this case, even when heat is generated in some battery modules 100, the heat may not be easily transferred to other battery modules 100. Thus, a temperature of the other battery modules 100 may be prevented from being increased by abnormal heating of the certain battery module 100. Moreover, according to the configuration, even when heat is simultaneously generated in several adjacent battery modules 100, the heat may be blocked, as occasion demands, from being transferred between the battery modules 100, thereby preventing the temperature of the battery module 100 from further increasing and enabling the bridge member 200 to contain the heat.

According to the above configuration, the bridge member 200 may be configured to allow the heat blocking portion 213 to be replaceable. For example, the heat blocking portion 213 of the bridge member 200 may be configured to be detachable from the first body portion 211 and/or the second body portion 212. In this case, a user may mount or separate the heat blocking portion 213 on or from the first body portion 211 and/or the second body portion 212.

According to the configuration of the present disclosure, it is possible to suitably change a heat blocking performance between the first and second body portions 211 and 212 by the heat blocking portion 213, as occasion demands. For example, when the user determines that heat needs to be directly transferred between the first and second body portions 211 and 212, the heat blocking portion 213 formed of a material having no or low thermal conductivity may be separated from the first and second body portions 211 and 212, and the heat blocking portion 213 formed of a material having a high thermal conductivity may be newly coupled to the first and second body portions 211 and 212. Accordingly, it is possible to suitably change a heat absorption or heat transfer performance between the battery modules 100 by the bridge member 200 depending on a situation.

Preferably, the bridge member 200 may be configured to allow the heat absorbing material C provided in the internal space to be replenished or withdrawn. This is described in detail with reference to FIG. 10.

Figure 10:
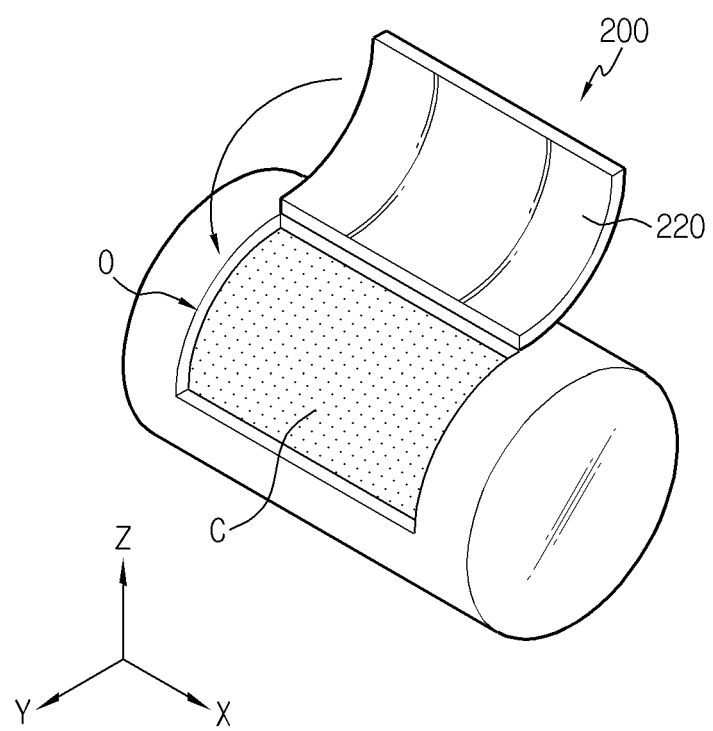
FIG. 10 is a perspective view schematically showing a configuration of a bridge member, according to another embodiment of the present disclosure.

FIG. 10 is a perspective view schematically showing a configuration of the bridge member 200, according to another embodiment of the present disclosure. Hereinafter, details that are different from the above embodiments are mainly described, and details to which the same or similar descriptions as the above embodiments are applicable are omitted.

Referring to FIG. 10, the bridge member 200 may include the heat absorbing material C in the internal space. In particular, the bridge member 200 may be configured to allow the internal space to be opened or closed. For example, as shown in FIG. 10, the bridge member 200 may include an opening portion O that opens the internal space in which the heat absorbing material C is provided. Further, the bridge member 200 may include a cover portion 220 to open or close the opening portion O. The cover portion 220 may be configured such that one end is coupled to a body of the bridge member 200 and configured to be pivotable around a hinge. In this case, the user may open the cover portion 220 and insert or take out the heat absorbing material C through the opening portion O.

According to the configuration of the present disclosure, the heat absorbing material C may be easily replenished, replaced, or the like. For example, when a heat absorption performance of the bridge member 200 is deteriorated due to alteration or leakage of the heat absorbing material C, the user may replenish or replace the heat absorbing material C via a configuration of the opening portion O and cover portion 220. Alternatively, the user may configure the bridge member 200 to include the heat absorbing material C having various different characteristics. In other words, in a general situation, the heat absorbing material C may be contained inside the bridge member 200 in a sealed state, and the heat absorbing material C may not flow into the bridge member 200 or out of the bridge member 200. However, when a special situation occurs, for example, when the heat absorbing material C needs to be replaced, the user may take the heat absorbing material C out of the bridge member 200 or insert the heat absorbing material C into the bridge member 200 via the configuration of the opening portion O and cover portion 220.

In particular, the bridge member 200 may be configured such that the opening portion O and the cover portion 220 are provided at a center portion of the body, as shown in FIG. 10. In other words, the opening portion O and cover portion 220 of the bridge member 200 may be provided in a region that does not contact the battery module 100, i.e., a region that is not coupled with the battery module 100.

According to the configuration of the present disclosure, it is possible to insert or take out the heat absorbing material C through the opening portion O and the cover portion 220 even after the bridge member 200 is mounted and fixed between the battery modules 100. Thus, after the battery pack is assembled, the replacing, replenishing, or the like of the heat absorbing material C may be conveniently performed without having to disassemble the bridge member 200.

Further, the heat absorbing material C provided in the bridge member 200 may be in a liquid state or a gel state. In this case, the opening portion O and the cover portion 220 do not need to have a size that corresponds to an overall size of the heat absorbing material C, and may have a smaller size.

Meanwhile, the plurality of battery modules 100 included in the battery pack may be arranged in parallel in a horizontal direction on an X-Y plane, as shown in FIGS. 1 and 2. In this case, the battery modules 100 may be spaced apart from each other by a predetermined distance in the horizontal direction.

In such a configuration, the bridge member 200 may be disposed at an upper corner portion of the battery module 100. For example, in the configuration of FIG. 1, when the two battery modules 100 are arranged in the left-and-right direction (X-axis direction in the drawing), the bridge member 200 may be disposed at the top in the space between the two battery modules 100. In detail, both ends of one bridge member 200 may contact and be fixed to an upper front corner of a right surface of the first battery module B1 and an upper front corner of a left surface of the second battery module B2. Subsequently, both ends of the other bridge member 200 may contact and be fixed to an upper rear corner of the right surface of the first battery module B1 and an upper rear corner of the left surface of the second battery module B2.

According to the configuration in which the bridge member 200 is disposed at the upper corner portion of the battery module 100, a space for buffering the swelling of the battery module 100 may be secured. In other words, since the bridge member 200 is disposed at the upper corner portion among the side surface of the battery module 100 and is not disposed in a center portion, the center portion of the battery module 100 may not be contacted by another component and may be spaced apart from the adjacent battery module 100 as an empty space. Accordingly, even when the center portion of the battery module 100 swells up by the cell swelling, a problem such as pressing of the other battery module 100, or the like, is less likely to occur.

Moreover, the battery module 100 may include a plurality of pouch type secondary batteries, and the pouch type secondary batteries may be arranged in parallel in the left-and-right direction (X-axis direction of the drawing) in an upright position in the top-and-bottom direction (Z-axis direction of the drawing). In other words, each pouch type secondary battery may be configured that wide surfaces face the left and right sides and sealing portions are disposed in up, down, front, and rear directions. Further, the plurality of pouch type secondary batteries may be stacked in the left-and-right direction while the wide surfaces face each other. In this case, when swelling occurs in some secondary batteries, the center portion among the left and right surfaces of the battery module 100 may swell up the most. However, according to the above embodiments, since the center portion of the left and right surfaces of the battery module 100 remain as an empty space without the bridge member 200 being disposed, a damage or a deformation of the battery pack may be prevented despite of a swelling phenomenon of the battery module 100.

Furthermore, as shown in FIG. 2, the battery pack may include a cooling configuration, such as the heat sink 300, therebelow. In this case, a bottom portion of the battery pack may be satisfactorily cooled, but a cooling efficiency of an upper portion of the battery pack may be somewhat lower than the lower portion. However, according to the configuration in which the bridge member 200 is disposed at the top of the battery module 100 as in the above embodiment, a cooling performance may be increased by the bridge member 200, and thus the upper portion of the battery pack may be effectively cooled. Accordingly, in this case, the overall cooling performance of the upper and lower portions of the battery pack may be stably secured.

Preferably, the bridge member 200 may be configured to be detachable from the battery module 100. In this case, the battery module 100 may include a corresponding component to enable the bridge member 200 to be detached. This is described in detail with reference to FIG. 11.

Figure 11:
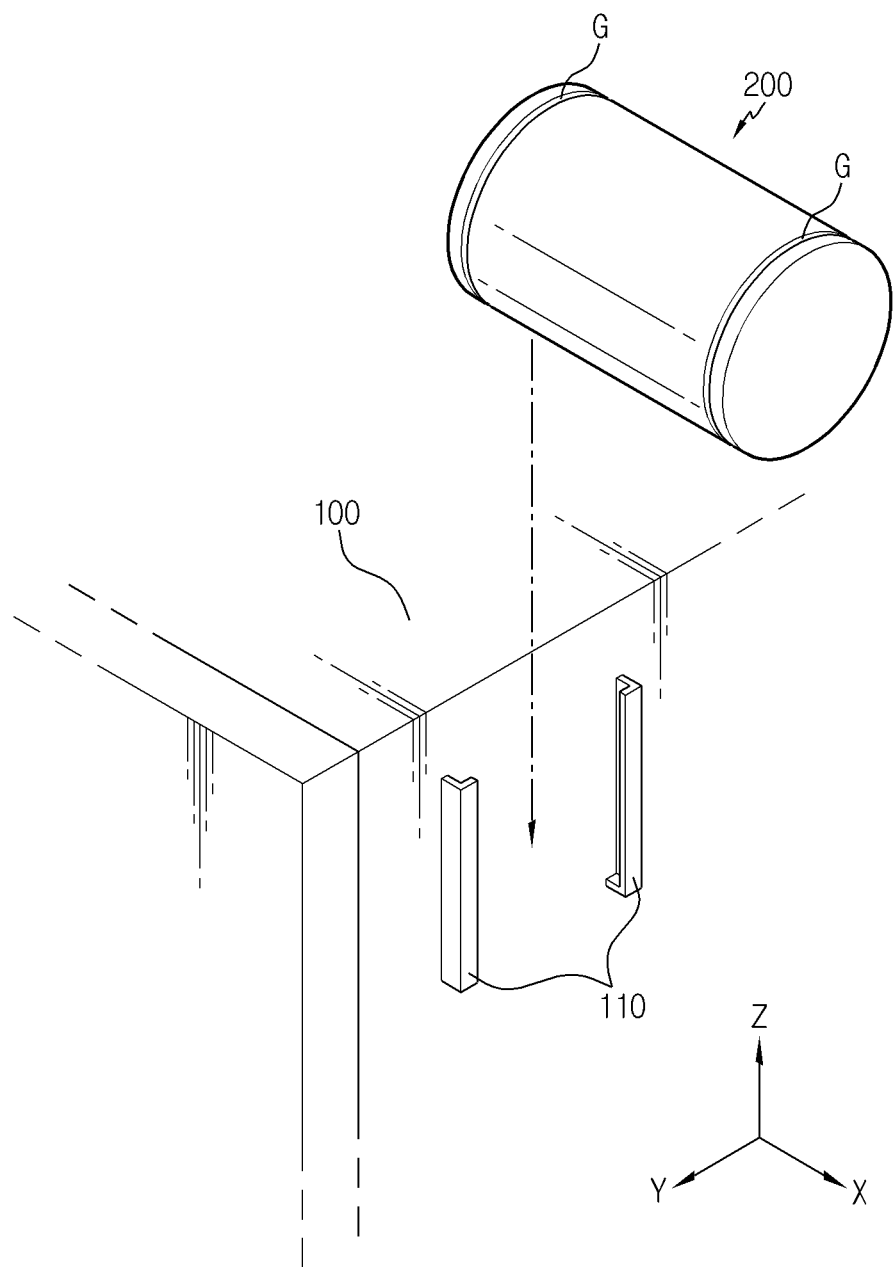
FIG. 11 is a perspective view schematically showing a coupling configuration of a battery module and a bridge member, according to another embodiment of the present disclosure.

FIG. 11 is a perspective view schematically showing a coupling configuration of the battery module 100 and the bridge member 200, according to another embodiment of the present disclosure. For example, the configuration of FIG. 11 may be another embodiment applicable to the region A1 of FIG. 1.

Referring to FIG. 11, the bridge mounting portion 110 may be provided on the outer surface of the battery module 100 to allow an end portion of the bridge member 200 to be slidingly coupled. In particular, the bridge mounting portion 110 may be configured in a guide rail shape to guide a sliding movement of the bridge member 200 in a top and bottom direction. The bridge mounting portion 110 may include two rails as guide rails. Further, each rail may be extended in the top-and-bottom direction to allow the bridge member 200 to slide only in the top-and-bottom direction without being detached in a direction facing another battery module (i.e., +X-axis direction of the drawing) or in a direction facing the front or back of the battery module 100 (i.e., Y-axis direction of the drawing), while the end portion of the bridge member 200 is coupled thereto. Moreover, a bottom end of the bridge mounting portion 110 (e.g., a bottom end of the guide rail) may be configured to prevent the bridge member 200 from moving further in a downward direction. In this case, the bridge member 200 may include a sliding groove G on an outer surface of an end portion to be slidingly coupled along the guide rail of the bridge mounting portion 110.

According to the configuration of the present disclosure, since the bridge member 200 is detachably configured via the slide coupling to the battery module 100, the bridge member 200 may be easily mounted on the battery module 100 during battery pack assembly. In other words, as indicated by an arrow in FIG. 11, the bridge member 200 may be coupled and fixed to the battery module 100 by moving the bridge member 200 in a downward direction from being disposed above the battery module 100. Accordingly, an assembling property of the battery pack may be improved. Further, since separation of the bridge member 200 is facilitated after the battery pack is assembled, replacement, repair, location change, or the like of the bridge member 200 or battery module 100 may be facilitated.

Moreover, as shown in FIG. 11, the bridge member 200 may be configured to be detachable in an upward direction. In this case, after the battery pack is assembled as the bridge member 200 is mounted and coupled to the outer surface of the battery module 100, the bridge member 200 may be easily detached in the upward direction without having to entirely change the position of the battery module 100. In addition, processes of replacing or repairing the bridge member 200 and then coupling the bridge member 200 to the outer surface of the battery module 100 may be easily performed.

Meanwhile, in FIG. 11, the bridge member 200 is configured to be coupled in a downward direction from the top of the battery module 100, but the bridge member 200 may be configured to be coupled in a backward direction from the front of the battery module 100 or in a forward direction from the back of the battery module 100. For example, the bridge member 200 may be provided at the upper front corner of the battery module 100 to be detachable in the forward direction. Alternatively, the bridge member 200 may be provided at the upper rear corner of the battery module 100 to be detachable in the backward direction. Even by such a configuration, after the battery pack is assembled, the bridge member 200 may be easily replaced or repaired. In other words, the bridge member 200 may be configured to be separable in an outward direction of the battery module 100.

The bridge member 200 may be coupled and fixed to the battery module 100. For example, both ends of the bridge member 200 may be coupled and fixed to the battery module 100. In particular, the battery pack according to the present disclosure may be configured to prevent the bridge member 200 from easily moving in a particular direction while being coupled to the battery module 100. For example, as shown in FIG. 11, the bridge mounting portion 110 of the module case may be configured in a guide rail shape to allow the bridge member 200 to move only in the top-and-bottom direction (Z-axis direction) and restrict the bridge member 200 from moving in the left-and-right direction (X-axis direction) and the front-and-back direction (Y-axis direction).

Moreover, by restricting the detachment of the bridge mounting portion 110 in a direction facing another battery module (+X-axis direction of FIG. 11), the two battery modules 100 disposed at both sides of the bridge mounting portion 110 may be coupled and fixed to each other. Thus, according to the configuration of the present disclosure, an overall structure of the battery pack may be stably maintained by the bridge member 200. In particular, even when a separate coupling component is not additionally provided between the battery modules 100, the plurality of battery modules 100 may be coupled and fixed to each other by the bridge member 200 and a distance between the battery modules may be maintained to a predetermined distance.

Preferably, the bridge member 200 may be configured to allow the coupling location to be changeable with respect to the outer surface of the battery module 100. This is described in detail with reference to FIG. 12.

Figure 12:
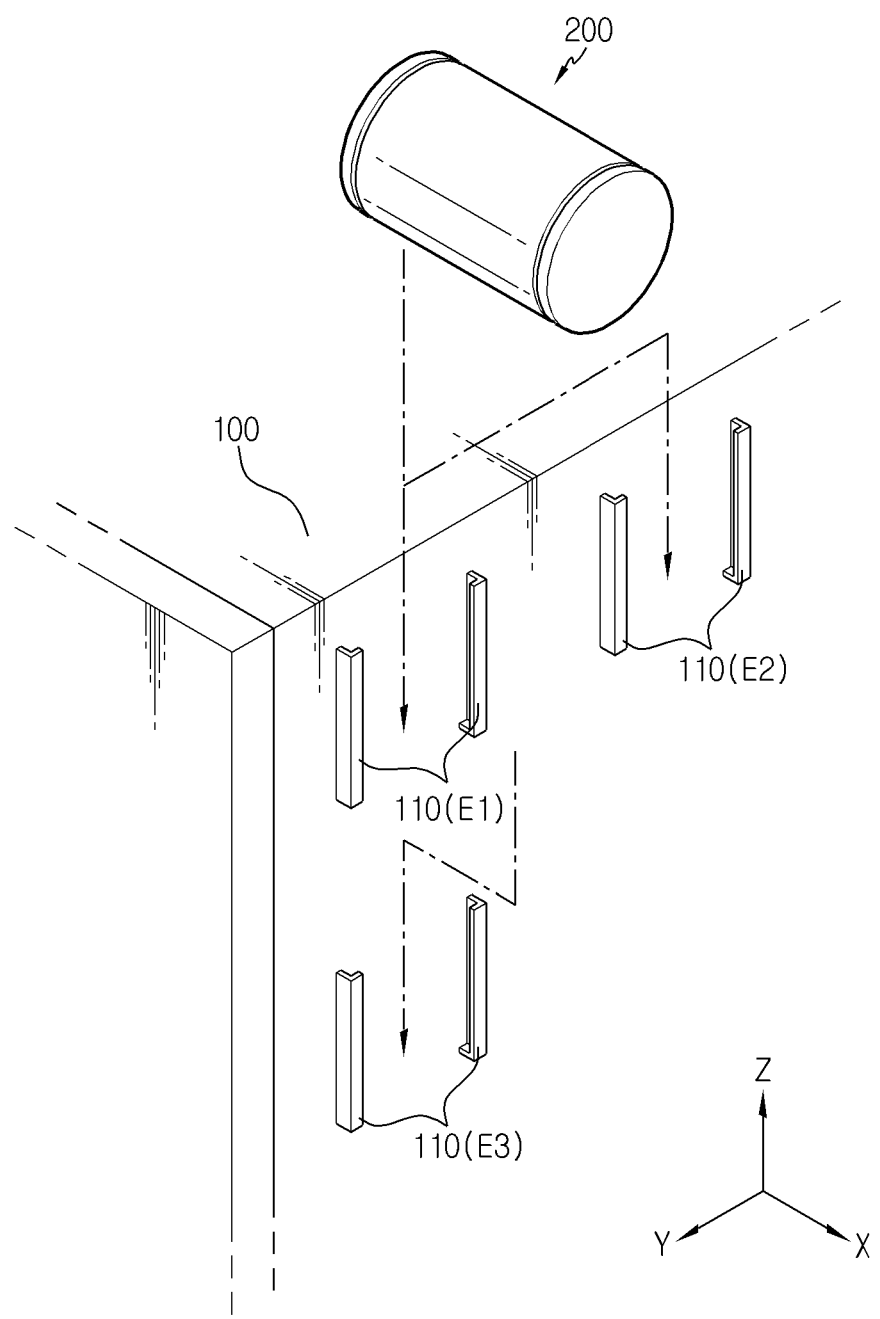
FIG. 12 is a perspective view schematically showing a coupling configuration of a battery module and a bridge member, according to another embodiment of the present disclosure.

FIG. 12 is a perspective view schematically showing a coupling configuration of the battery module 100 and the bridge member 200, according to another embodiment of the present disclosure. Hereinafter, details that are different from the above embodiments are mainly described.

Referring to FIG. 12, a plurality of coupling configurations to which a bridge member 200 is coupled may be provided on the outer surface of the battery module 100. For example, similar to the embodiment of FIG. 11, the bridge mounting portion 110 having the guide rail shape may be provided on the outer surface of the battery module 100 to be slidingly coupled to the bridge member 200. However, unlike the embodiment of FIG. 11, a plurality of guide rails may be provided at different locations in the embodiment of FIG. 12. In other words, in the embodiment of FIG. 12, three guide rails E1, E2, and E3 may be formed at different locations, as features to which a bridge member 200 may be coupled. A bridge member 200 may be slidingly coupled to any one of the plurality of guide rails E1, E2 and E3, i.e., to the bridge mounting portion 110.

In particular, the three guide rails E1, E2 and E3 (bridge mounting portion 110) may be configured to have different vertical positions or horizontal positions in the battery module 100. For example, in the embodiment of FIG. 12, the guide rail E2 may be disposed deeper than the guide rail E1, i.e., closer to the inside of the battery module 100 in the front-and-back direction (Y-axis direction). In the embodiment of FIG. 12, the guide rail E3 may be disposed lower than the guide rail E1, i.e., closer to the inside of the battery module 100 in the top-and-bottom direction (Z-axis direction).

According to the configuration of the present disclosure, the coupling location of the bridge member 200 may be suitably adjusted depending on a situation. For example, the location of the bridge member 200 may be adjusted to be closer to a region of the battery module 100 where a large amount of heat is generated or expected to be generated. Alternatively, the location of the bridge member 200 may be adjusted to a region of the battery module 100 where less expansion is generated. For example, when the battery pack is configured as the plurality of battery modules 100 stacked on each other, the temperature may be higher at places closer to the center portion of the battery pack. In this case, the bridge member 200 may be mounted and coupled to the bridge mounting portion 110 disposed at the center portion of the battery pack as close as possible, with respect to each battery module 100. In detail, in the configuration of FIG. 12, when the battery module 100 shown in the drawing is a battery module disposed at the top with respect to the center of the battery pack, the bridge member 200 may be coupled to the bridge mounting portion E3, which is closer to the center of the battery pack, instead of the bridge mounting portions E1 and E2. Alternatively, when the battery module 100 shown in FIG. 12 is a battery module disposed at the bottom with respect to the center of the battery pack, the bridge member 200 may be coupled to the bridge mounting portion E1 or E2 than to the bridge mounting portion E3. According to such a configuration, the bridge member 200 may be disposed at a suitable region of the battery module 100 based on a specific and individual situation.

Figure 13:
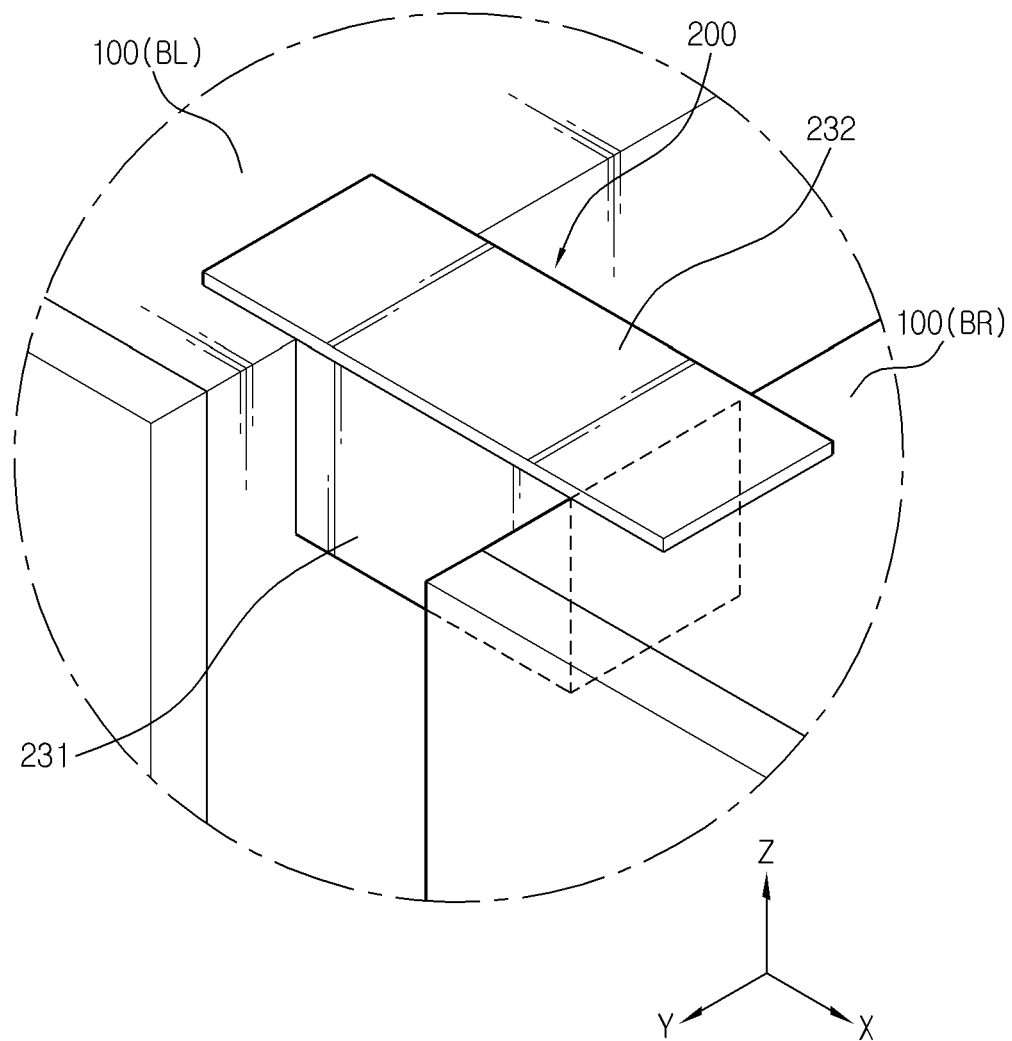
FIG. 13 is a perspective view schematically showing a configuration of a bridge member, according to another embodiment of the present disclosure.

FIG. 13 is a perspective view schematically showing a configuration of the bridge member 200, according to another embodiment of the present disclosure. Hereinafter, details different from the above embodiments are mainly described.

Referring to FIG. 13, the bridge member 200 may include an inserting portion 231 and a mounting portion 232.

In particular, the inserting portion 231 may be a component disposed between side surfaces of the battery module 100, and the above embodiments, for example, the configurations applied to the bridge member 200 of FIGS. 3, 4, and 7 through 10, may be similarly applied. For example, the inserting portion 231 may be formed of an electrically conductive material or may include the heat absorbing material C therein. Both ends of the inserting portion 231 may contact the battery module 100. In other words, a left end portion and a right end portion of the inserting portion 231 may respectively contact the right surface of the left battery module BL and the left surface of the right battery module BR. Accordingly, the inserting portion 231 may receive heat from the left and right battery modules BL and BR, and then transmit the heat to another battery module or store the heat therein. However, in the configuration of FIG. 13, the inserting portion 231 has a rectangular pillar shape, but the shape may be varied to other various shapes.

The mounting portion 232 may be coupled to a top portion of the inserting portion 231 and mounted on a top surface of the battery module 100. In particular, the mounting portion 232 may be formed in an approximate plate shape to be easily mounted on the top surface of the battery module 100, and prevented from protruding in an upward direction of the battery module 100. Further, a bottom surface of the mounting portion 232 may be coupled and fixed to the top surface of the battery module 100. For example, an adhesive may be provided on the bottom surface of the mounting portion 232 to adhere the bottom surface of the mounting portion 232 to the top surface of the battery module 100. Alternatively, a coupling protrusion (not shown) that protrudes in a downward direction may be provided on bottom surfaces of both left and right ends of the mounting portion 232. In addition, a coupling groove (not shown) may be provided on the top surfaces of the left and right battery modules BL and BR, at the location and in the shape that correspond to the coupling protrusion. In this case, the coupling protrusion of the mounting portion 232 may be inserted and coupled to the coupling groove of the battery module 100, thereby coupling and fixing the bridge member 200 to the battery module 100.

According to the configuration of the present disclosure, the inserting portion 231 may be inserted between the battery modules 100 by mounting the mounting portion 232 on the top surface of the battery module 100, thereby receiving heat from the each battery module 100. Accordingly, the assembly of the bridge member 200 and the battery module 100 may be easily achieved. A separate coupling configuration between the battery module 100 and both ends of the inserting portion 231, for example, an adhesive, may not be provided. Accordingly, the structure of the battery module 100 may be simplified, and a heat transfer performance between the inserting portion 231 and the battery module 100 may be prevented from being deteriorated by a coupling configuration. In other words, a configuration for coupling the bridge member 200 and the battery module 100 may be provided in the mounting portion 232 and not provided in the inserting portion 231, and thus the inserting portion 231 may be configured in a shape optimized to transfer heat with respect to the battery module 100, or absorb or store the heat. Accordingly, in this case, the cooling performance may be further improved by the bridge member 200. On the other hand, the mounting portion 232 of the bridge member 200 may be configured in a shape optimized to be coupled and fixed to the battery module 100, in particular, the module case of the battery module 100. Accordingly, in this case, it is easier to secure fixability between the battery modules 100 by the bridge member 200.

Figure 14:
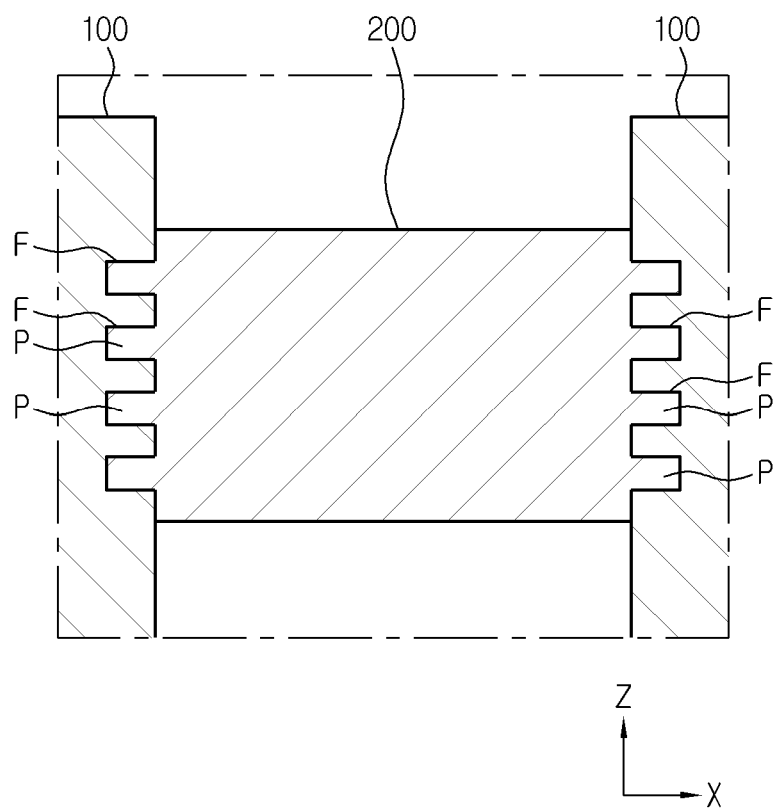
FIG. 14 is a front cross-sectional view schematically showing a configuration of a bridge member and a battery module, according to another embodiment of the present disclosure.

FIG. 14 is a front cross-sectional view schematically showing a configuration of the bridge member 200 and the battery module 100, according to another embodiment of the present disclosure. For example, FIG. 14 may be an embodiment of a cross section viewed from the front with respect to the region A1 of FIG. 1. In following embodiments as well as the current embodiment, details that are different from the above embodiments are mainly described.

Referring to FIG. 14, the battery module 100 and the bridge member 200 may have corrugated portions formed in shapes that correspond to each other at regions contacting each other. For example, as shown in FIG. 14, the bridge member 200 may include a plurality of protrusions P that protrude in horizontally outward directions, i.e., in a leftward direction and a rightward direction. In addition, the battery module 100 may include a plurality of grooves F that are recessed in inward directions in sizes and shapes that correspond to the protrusions P. In other words, the protrusion P may be configured to be inserted into the groove F. Alternatively, contrary to such a configuration, the battery module 100 may include an protrusion that protrudes in an outward direction, and the bridge member 200 may include a groove that is recessed concavely in an inward direction.

According to the configuration in which the corrugated portions are formed in the battery module 100 and the bridge member 200 in corresponding shapes and at corresponding locations, a contact area between the battery module 100 and the bridge member 200 may be further increased. Accordingly, the heat transfer performance between the battery module 100 and the bridge member 200 may be further improved. Accordingly, a temperature control performance of the battery pack according to the present disclosure may be enhanced, for example, a thermal runaway phenomenon generated in the battery module 100 may be quickly prevented. Further, according to the configuration of the present disclosure, coupling between the battery module 100 and the bridge member 200 may be further improved by the corrugated configuration. For example, top-and-bottom direction (Z-axis direction) and front-and-back direction (Y-axis direction) movement of the bridge member 200 may be restricted by the corrugated configuration between the battery module 100 and the bridge member 200, and thus fixability of the bridge member 200 with respect to the battery module 100 may be further improved.

Moreover, in the corrugated configuration, each of the protrusion P and the groove F may have a flat bottom portion. For example, referring to each of the protrusions P in the configuration of FIG. 14, the protrusion P may be divided into a top portion and a bottom portion based on a portion that protrudes farthest in the outward direction. Accordingly, when a direction parallel to the ground is an X-axis direction, the bottom portion of the protrusion P may be approximately parallel to the ground.

According to the configuration of the present disclosure, the bridge member 200 may be further stably coupled to the battery module 100. In other words, when a corrugated portion of the bridge member 200 is coupled to a corrugated portion of the battery module 100, the bridge member 200 may not be easily detached in the outward direction, for example, in the X-axis direction or a Z-axis direction. Accordingly, assembling and coupling properties of the bridge member 200 and the battery module 100 may be improved.

Meanwhile, in such a configuration, a portion of the battery module 100 to which the corrugated portion of the bridge member 200 is coupled may be the bridge mounting portion 110 of the above embodiment. In other words, the corrugated portion may be formed on the bridge mounting portion 110 of the battery module 100 to be coupled to the corrugated portion of the bridge member 200.

Further, in the above embodiment, a TIM or an adhesive material may be disposed between the corrugated configurations of the battery module 100 and bridge member 200. In this case, the heat transfer performance between the battery module 100 and the bridge member 200 may be further improved as an empty space between the corrugated configurations is reduced.

Figure 15:
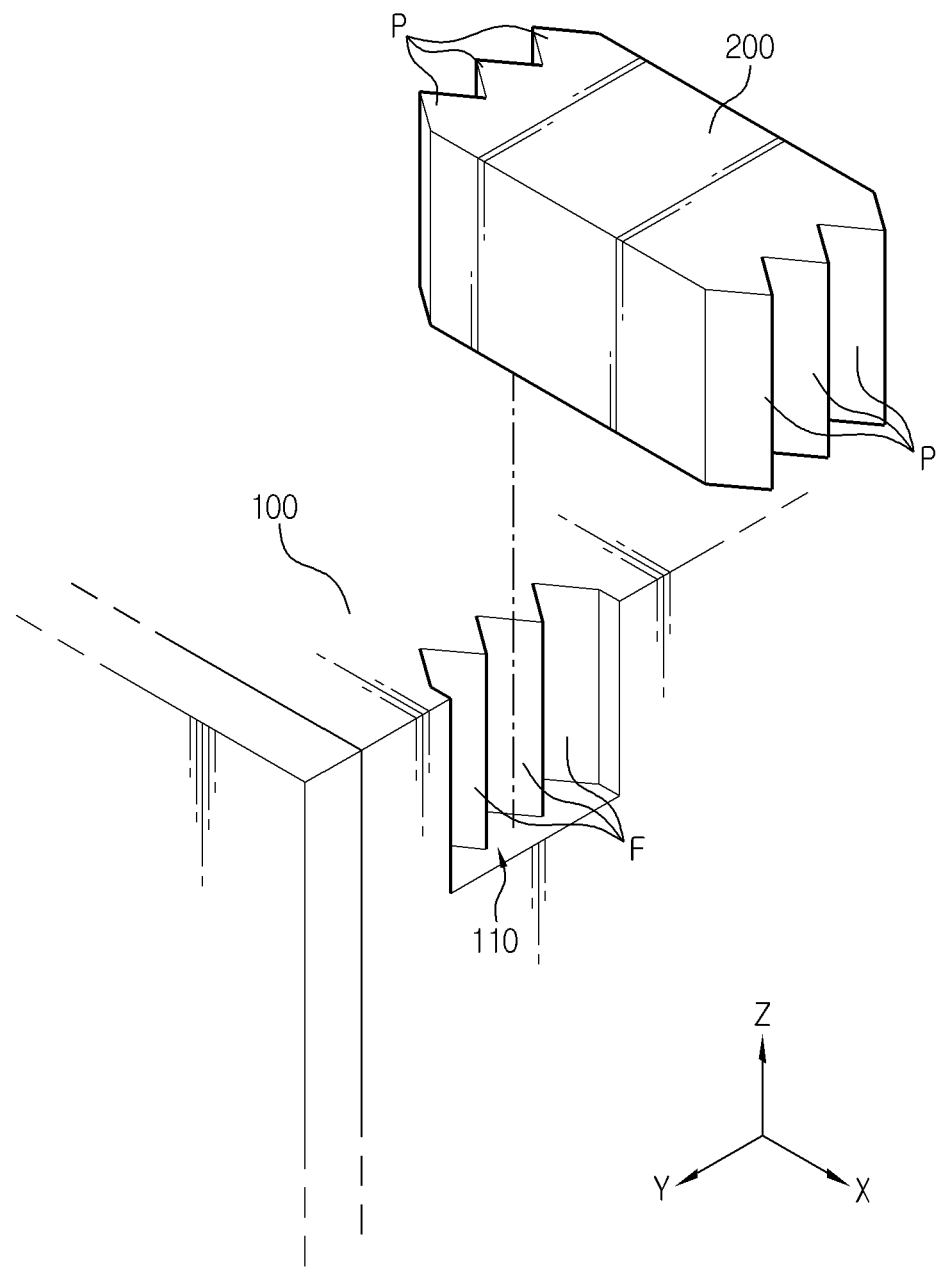
FIG. 15 is a perspective view schematically showing a partial configuration of a bridge member and a battery module, according to another embodiment of the present disclosure.

FIG. 15 is a perspective view schematically showing a partial configuration of the bridge member 200 and the battery module 100, according to another embodiment of the present disclosure.

Referring to FIG. 15, like FIG. 14, the bridge member 200 and the battery module 100 may include corrugated portions in corresponding shapes at regions that contact each other. Moreover, the corrugated portion of the battery module 100 may be formed on the bridge mounting portion 110 of the battery module 100. However, in the embodiment of FIG. 15, a shape of the corrugated portion is different from that of FIG. 14. In other words, in the configuration of FIG. 14, the corrugated configuration is formed in the top-and-bottom direction (Z-axis direction of the drawing), whereas in the configuration of FIG. 15, the corrugated configuration is formed in a horizontal direction, in particular, in a front-and-back direction (Y-axis direction of the drawing). In detail, referring to the configuration of FIG. 15, the protrusion P of the bridge member 200 is elongated in the top-and-bottom direction (Z-axis direction), wherein a concave portion and a convex portion alternately exist in the front-and-back direction (Y-axis direction). According to such a shape, the bridge mounting portion 110 of the battery module 100 may also be elongated in the top-and-bottom direction and include a corrugated portion in which a concave portion and a convex portion are alternately arranged in the front-and-back direction.

According to the configuration of the present disclosure, a contact area between the battery module 100 and the bridge member 200 is increased by the corrugated configurations, the coupling property may be improved, and in addition, the top-and-bottom direction movement of the bridge member 200 may be guided. In other words, since the concave portions or the convex portions provided in the corrugated configurations of the bridge member 200 and the battery module 100 are elongated in the top-and-bottom direction, the bridge member 200 may be mounted on the bridge mounting portion 110 of the battery module 100 by being slid in the top-and-bottom direction. Further, the bridge member 200 may be supported in the upward direction as movement is restricted in the downward direction from a bottom end point of the bridge mounting portion 110 where the corrugated configuration is ended. Thus, according to such a configuration, the assembling property of the battery module 100 and the bridge member 200 may be further improved.

In particular, the corrugated configuration provided in the battery module 100 may extend to an upper end of the battery module 100 as shown in FIG. 15. In this case, the bridge member 200 may be easily detached or coupled in the upward direction while the plurality of battery modules 100 are coupled. Accordingly, the bridge member 200 may be easily assembled or replaced while the battery pack is assembled or repaired. Moreover, such a configuration may be easily combined with the configurations of FIGS. 11 and 12.

Figure 16:
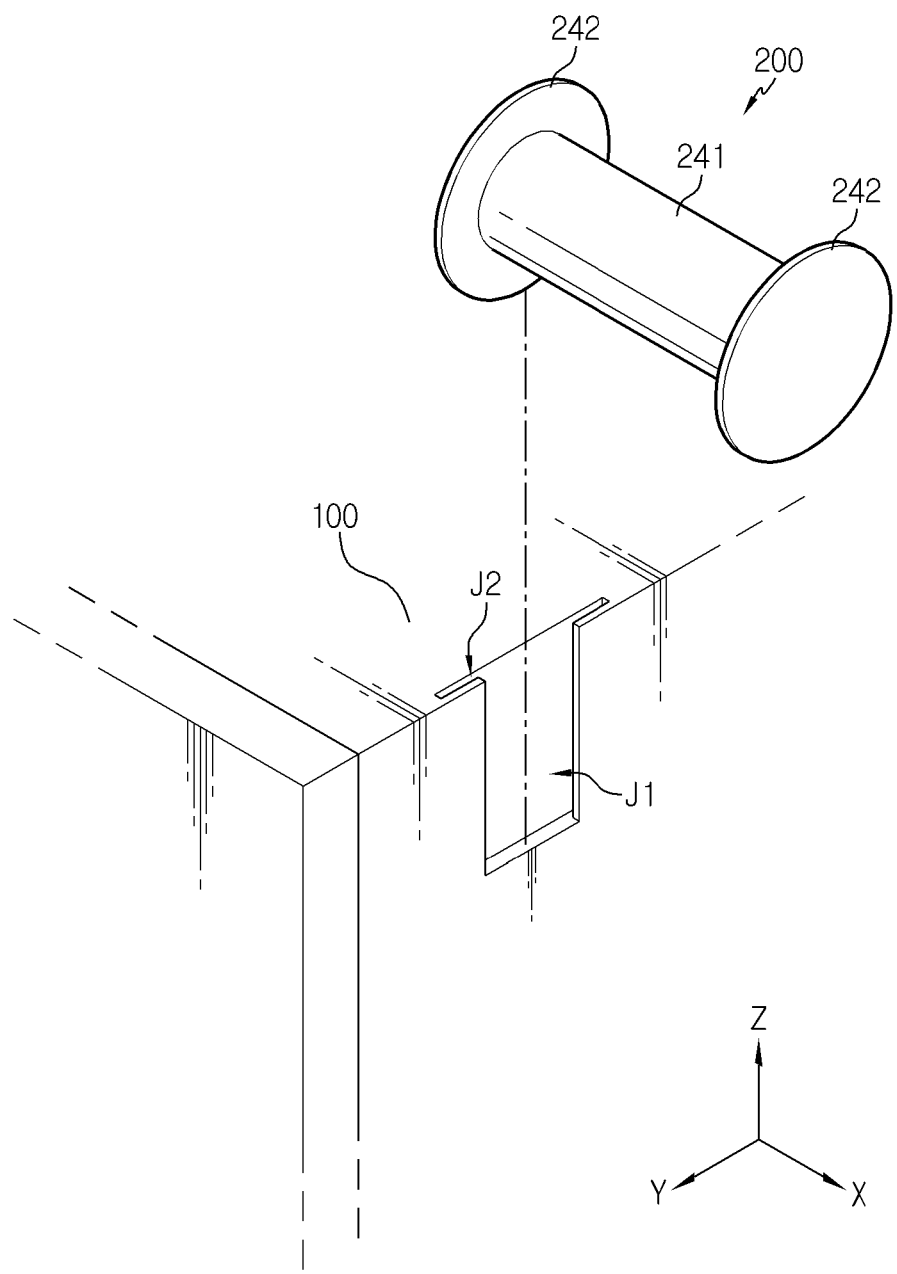
FIG. 16 is an exploded perspective view schematically showing a partial configuration of a bridge member and a battery module, according to another embodiment of the present disclosure.

FIG. 16 is an exploded perspective view schematically showing a partial configuration of the bridge member 200 and the battery module 100, according to another embodiment of the present disclosure. Details different from the above embodiments are mainly described.

Referring to FIG. 16, the bridge member 200 may include a main body 241 and an expanding plate 242. Detailed descriptions about the main body 241 are omitted since the configuration of the bridge member 200 of the above embodiments may be applied. For example, the main body 241 may include the heat absorbing material C.

However, in the embodiment of FIG. 16, unlike the above embodiment, the expanding plate 242 is further provided on both ends of the bridge member 200. The expanding plate 242 may have a size, for example, an outer diameter, that is larger than the main body 241. In other words, referring to the configuration of FIG. 16, the expanding plate 242 may have a size larger than the main body 241 on a Y-Z plane. In detail, when the battery modules 100 are arranged in the left-and-right direction and the bridge member 200 is provided therebetween, the expanding plate 242 may be provided on the left end portion and the right end portion of the bridge member 200 in a shape that protrudes in front, back, left, and right directions farther than the main body 241. In other words, the bridge member 200 may be configured to allow both end portions contacting or coupled to the battery modules 100 to be enlarged compared to other portions, for example, a center portion. An expanding direction of the bridge member 200, i.e., an expanding direction of the expanding plate 242 with respect to the main body 241 may be a direction (direction on a Y-Z plane of the drawing) perpendicular to the arranged direction (X-axis direction of the drawing) of the battery modules 100 provided at both sides of the bridge member 200. In this case, in the bridge member 200, the size of the expanding plate 242 may be larger than the size of the main body 241 based on a cross-section orthogonal to the stacked direction of the battery modules 100.

The expanding plate 242 may be configured in a plate shape, and two wide surfaces may respectively face the main body 241 and the outer surface of the battery module 100. Further, the expanding plate 242 may be formed of a material having a high thermal conductivity, for example, a metallic material, to secure the heat transfer performance. In particular, the expanding plate 242 may be formed of the same material as the main body 241 or the same material as at least an exterior material of the main body 241.

According to the configuration of the present disclosure, the heat transfer performance between the battery module 100 and the bridge member 200 may be further improved. In other words, since the bridge member 200 and the battery module 100 may contact each other in a wider area by the expanding plate 242, a larger amount of heat may be quickly transferred. Since the size of the main body 241 is smaller than a size of the expanding plate 242, a space between the battery modules 100 may be widely secured.

Meanwhile, in such a configuration, the battery module 100 may include a slit into which the expanding plate 242 is inserted. For example, as indicated by an arrow J2 in FIG. 16, the module case of the battery module 100 may include a slit configured to allow the expanding plate 242 to be inserted. The slit J2 may have a size that corresponds to the size of the expanding plate 242, and may extend in the top-and-bottom direction. Further, a top end of the slit J2 may be opened toward the top portion of the battery module 100. The module case of the battery module 100 may include a main body inserting groove J1 that has a size smaller than the slit J2 and has a size and a shape that correspond to the main body 241 of the bridge member 200. The main body inserting groove J1 may extend in the upward direction and have an opened top end like the slit J2.

According to the configuration of the present disclosure, not only the heat transfer performance between the battery module 100 and the bridge member 200 may be improved by the expanding plate 242 of the bridge member 200, but also the assembling property and coupling property between the battery module 100 and the bridge member 200 may be improved. In other words, the bridge member 200 may be easily coupled to the battery module 100 by sliding in a downward direction from the top, and easily detached from the battery module 100 by sliding in an upward direction from the bottom. In this case, a TIM or an adhesive material may be easily coupled in the slit J2 of the battery module 100. Accordingly, the heat transfer performance or fixing performance by the TIM or the adhesive material may be further stably secured. Meanwhile, according to such a configuration, both or some of the main body inserting groove J1 and the slit J2 of the battery module 100 may function as the bridge mounting portion 110.

Figure 17:
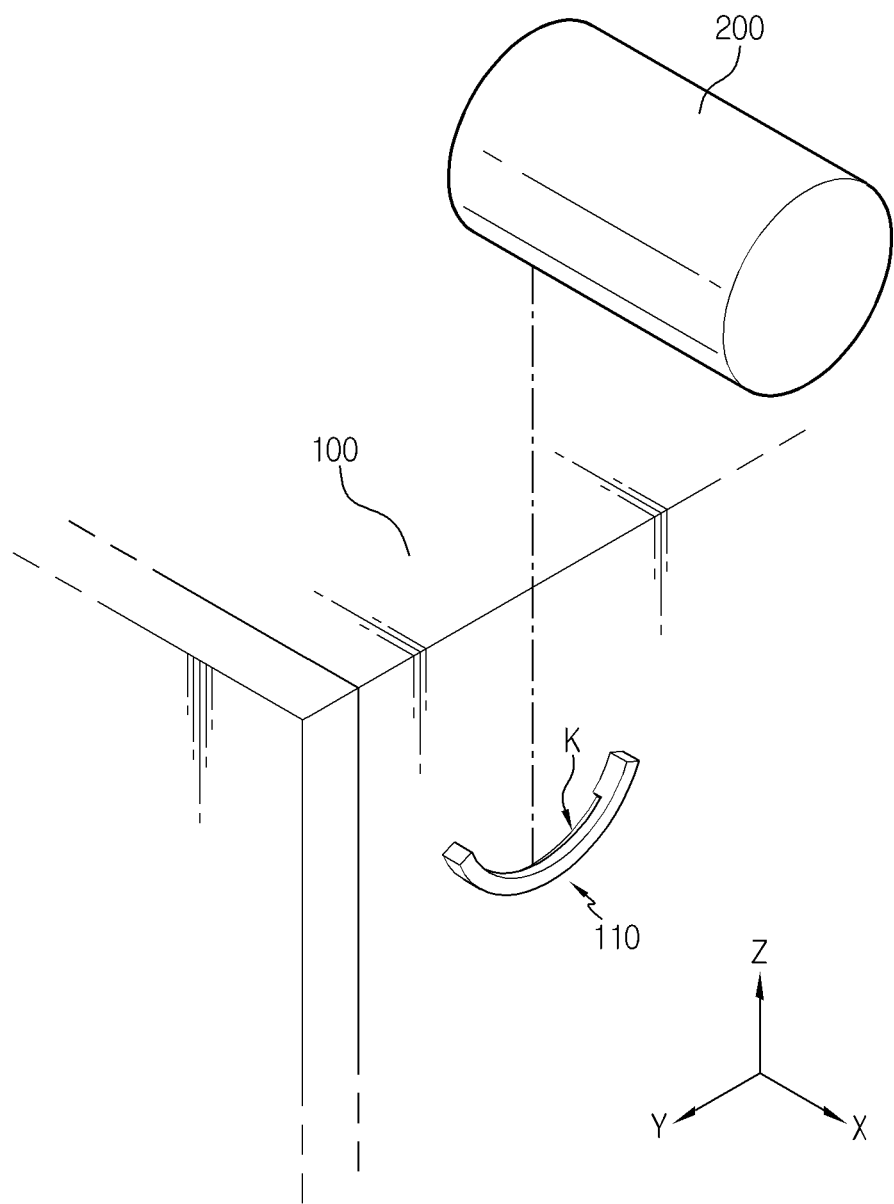
FIG. 17 is an exploded perspective view schematically showing a partial configuration of a bridge member and a battery module, according to another embodiment of the present disclosure.

FIG. 17 is an exploded perspective view schematically showing a partial configuration of the bridge member 200 and the battery module 100, according to another embodiment of the present disclosure. Details different from the above embodiments are mainly described.

Referring to FIG. 17, the battery module 100 may include the bridge mounting portion 110, while the bridge mounting portion 110 may include a containing groove having a shape concavely recessed in a downward direction as indicated by a reference character K. The containing groove K may be disposed lower than a portion of the bridge mounting portion 110 where the bridge member 200 is mounted. In other words, the bridge member 200 may not directly contact the containing groove K. However, a material disposed between the bridge member 200 and the battery module 100 may be filled and contained in the containing groove K. For example, a TIM, an adhesive material, or the like may be disposed between the bridge member 200 and the battery module 100, and such an intermediate material may be contained in the containing groove K. In particular, the TIM or the adhesive material may be disposed between the bridge member 200 and the battery module 100 while having fluidity, such as a liquid or gel that is not a complete solid, and the containing groove K may prevent such intermediate material from leaking outside by flowing down from the space between the bridge member 200 and the battery module 100 and stably contain the intermediate material in the space. Thus, according to the configuration of the present disclosure, the heat transfer performance, the adhering performance, or the like by the TIM or the adhesive material may be further stably secured.

Figure 18:
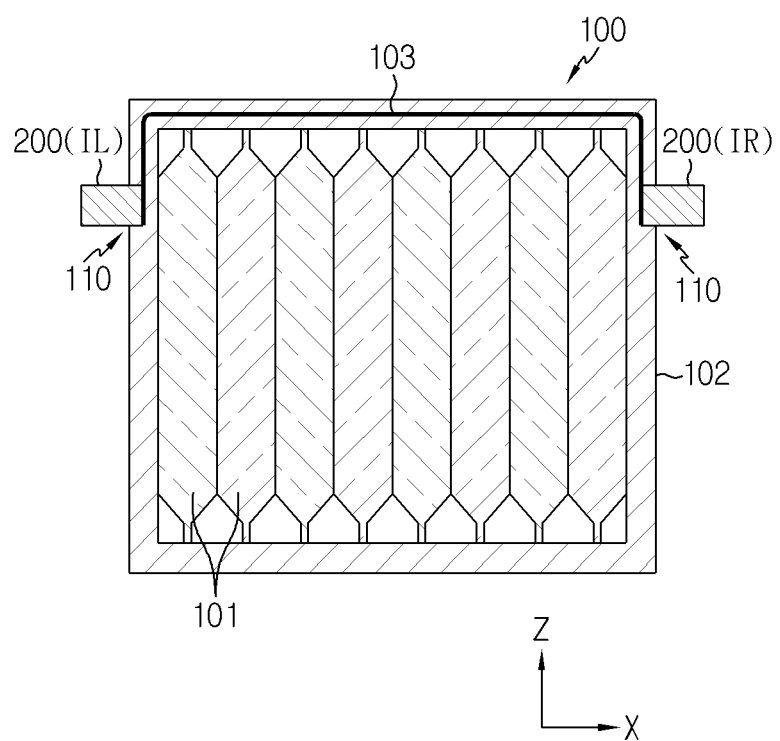
FIG. 18 is a front cross-sectional view schematically showing a partial configuration of a battery pack, according to another embodiment of the present disclosure.

FIG. 18 is a front cross-sectional view schematically showing a partial configuration of the battery pack 100, according to another embodiment of the present disclosure. Details different from the above embodiments are mainly described.

Referring to FIG. 18, the battery module 100 according to the present disclosure may further include a heat transfer member 103.

The heat transfer member 103 may be configured to transfer heat between the plurality of bridge members 200 when the plurality of bridge members 200 are mounted on a battery module 100. In this regard, the heat transfer member 103 may be formed of a heat conductive material, such as a metal. Further, one side of the heat transfer member 103 may be extended and connected to one bridge mounting portion and the other side of the heat transfer member 103 may be extended and connected to another bridge mounting portion.

For example, as shown in FIG. 18, the bridge mounting portion 110 may be formed on each of the left and right sides of the battery module 100, a left end portion of the heat transfer member 103 may be disposed to be connected to the left bridge mounting portion 110, and a right end portion of the heat transfer member 103 may be disposed to be connected to the right bridge mounting portion 110. Accordingly, when a left bridge member IL and a right bridge member IR are mounted on bridge mounting portions 110, respectively, the heat transfer member 103 may function as a path that transfers heat between the left bridge member IL and the right bridge member IR.

According to the configuration of the present disclosure, a plurality of bridge members may effectively share heat. For example, in the embodiment of FIG. 18, when heat is supplied to the right bridge member IR, the supplied heat may be quickly transferred from the right bridge member IR to the left bridge member IL. Thus, in this case, since heat may be distributed to the plurality of bridge members, the heat absorbing performance by the bridge member 200 may be further improved. Generally, a module case 102 is often formed of a material having low heat transfer performance, such as plastic, to achieve certain characteristics, such as electric insulation or light weight. However, according to such a configuration, even when the module case 102 is formed of such a material, a heat dissipation effect between the plurality of bridge members 200 and between the plurality of battery modules 100 may be further increased.

The heat transfer member 103 may have a plate shape. In this case, a wide surface may face a secondary battery 101 or a secondary battery stacked structure. For example, the heat transfer member 103 may be configured in a metal plate such that two wide surfaces respectively face upward and downward. According to such a configuration, the heat transfer member 103 may easily absorb heat from at least one secondary battery 101. In this case, even when heat is generated in any one of the plurality of secondary battery 101 accommodated in the battery module 100, the heat of the corresponding secondary battery 101 may be easily transferred to the heat transfer member 103.

Further, the heat transfer member 103 may be disposed at least at the top portion of the battery module 100 as shown in FIG. 18. In other words, the heat transfer member 103 may be configured to be disposed higher than the secondary battery 101 accommodated in the module case 102. Due to features of heat, heat generated in a secondary battery is likely to move upward, and thus a temperature of an upper portion of a battery module is likely to be higher than a temperature of a lower portion of the battery module. Thus, according to the embodiment, when the heat transfer member 103 is disposed at the top portion of the secondary battery 101, heat of the battery module 100, in particular, the secondary battery 101, may be further effectively absorbed.

Further, as shown in FIG. 18, at least a portion of the heat transfer member 103 may be embedded in the module case 102. In particular, the heat transfer member 103 may be embedded in the module case 102 not to be exposed to the exterior of the module case 102, except portions disposed at the bridge mounting portion 110, for example, both end portions. The exterior of the module case 102 denotes not only a direction facing the outside of a battery module, but also a direction facing the inside of the battery module, i.e., components such as a secondary battery, or the like. However, the portions of heat transfer member 103 disposed at the bridge mounting portion 110 may be exposed to the exterior to directly contact the bridge member 200. For example, an aperture may be formed in the bridge mounting portion 110 of the module case 102 such that the heat transfer member 103 embedded therein is exposed to the exterior.

According to the configuration of the present disclosure, electric insulation of the battery module 100 may be prevented from being deteriorated by the heat transfer member 103. In other words, the heat transfer member 103 may be formed of an electrically conductive material, such as a metal, to secure thermal conductivity. However, according to such a configuration, exposure of the heat transfer member 103 may be reduced to prevent an electric connection of the heat transfer member 103 with the secondary battery 101, a module terminal (not shown), or a module bus bar (not shown) from unintentionally occurring. Thus, in this case, the electric insulation of the battery module 100 and the battery pack may be stably secured.

Further, according to such a configuration, when heat is transferred from one bridge member 200 to the other bridge member 200 in a battery module 100, heat may be prevented from being transferred to the secondary battery 101. For example, in the configuration of FIG. 18, when heat is transferred from the right bridge member IR to the left bridge member IL, since the heat transfer member 103 is embedded in the module case 102, the heat transfer through the heat transfer member 103 to the secondary battery 101 may be prevented or reduced.

Figure 19:
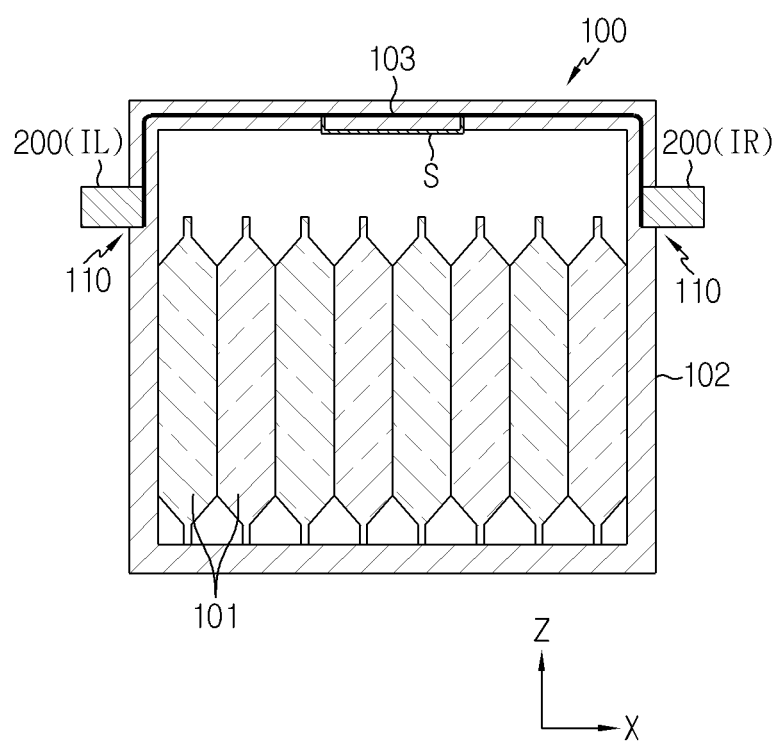
FIG. 19 is a front cross-sectional view schematically showing a partial configuration of a battery pack, according to another embodiment of the present disclosure.

FIG. 19 is a front cross-sectional view schematically showing a partial configuration of a battery pack, according to another embodiment of the present disclosure. FIG. 19 may be a modified example of the configuration of FIG. 18, and thus differences from FIG. 18 are mainly described.

Referring to FIG. 19, the heat transfer member 103 may include a heat absorbing plate S.

The heat absorbing plate S may have a plate shape and have at least one side connected to the heat transfer member 103. For example, as shown in FIG. 19, both ends of the heat absorbing plate S may be bent in an upward direction to be connected to a main body of the heat transfer member 103. In particular, the heat absorbing plate S may protrude toward the secondary battery 101 compared to the main body of the heat transfer member 103.

According to the configuration of the present disclosure, heat of the secondary battery 101 accommodated in the battery module 100 may be absorbed by the heat absorbing plate S and transferred to the plurality of bridge members 200 through the heat transfer member 103. Thus, in the case, when heat is generated in the secondary battery 101 inside the battery module 100, the generated heat may be quickly transferred to the bridge member 200 through the heat absorbing plate S, and thus the prevention of a thermal runaway may be further improved.

Moreover, the heat absorbing plate S may be disposed at the top portion of the secondary battery 101. When heat is generated in the secondary battery 101, the generated heat is likely to move upward, and thus when the heat absorbing plate S is disposed at the top portion as in the current embodiment, the heat inside the secondary battery 101 and the battery module 100 may be easily absorbed. Moreover, generally, since a relatively larger space exists in the internal space of the battery module 100 at the top portion of the secondary battery 101, a mounting space of the heat absorbing plate S may be easily secured according to the above configuration.

In particular, when the plurality of secondary batteries 101 are stacked in a direction parallel to the ground, i.e., in a direction parallel to the bottom surface of the module case 102 of the battery module 100 (X-axis direction of the drawing) in the internal space of the battery module 100, the heat absorbing plate S may be disposed at a center portion in the stacked direction of the secondary batteries 101. In other words, the heat absorbing plate S may be disposed at the upper center portion within the internal space of the battery module 100. In particular, the heat absorbing plate S being disposed at the center portion may mean that a distance between the heat absorbing plate S and the secondary battery 101 stacked at the center is shorter than a distance between the heat absorbing plate S and the secondary battery 101 stacked at an outermost region.

Temperature of a portion of the battery module 100 disposed at the center in the left-and-right direction therein may be the highest, and according to the above configuration, heat of the portion having the highest temperature of the battery module 100 may be quickly absorbed and distributed to the bridge member 200. Moreover, since the secondary battery 101 disposed at the center is far from the bridge member 200 compared to the secondary battery 101 disposed at the outermost region, heat dissipation may be somewhat delayed when a thermal runaway phenomenon is generated. However, when the heat absorbing plate S is disposed at the center of the battery module 100 as in the above embodiment, even when the thermal runaway phenomenon occurs in the secondary battery 101 disposed at the center, the corresponding heat may be quickly discharged to the bridge member 200 or out of the battery module 100.

Further, when the main body of the heat transfer member 103 is embedded in the module case 102, the heat absorbing plate S may be exposed to exterior of the module case 102. For example, as shown in the drawing, the heat absorbing plate S may be configured to allow the top surface to make a surface contact with the upper inner surface of the module case 102, and the bottom surface to face the stacked structure of the secondary batteries 101. In this case, the heat absorbing plate S may face the secondary battery 101 while being disposed close to the secondary battery 101, and thus may quickly absorb heat from the secondary battery 101. Accordingly, the heat absorbing performance by the heat absorbing plate S may be further improved.

Meanwhile, in the embodiment of FIG. 19, the heat absorbing plate S is configured in a plate shape that is oriented approximately in a horizontal direction, wherein the left and right end portions are bent in the upward direction, but the present disclosure is not limited by the shape of the heat absorbing plate S. For example, the heat absorbing plate S may be configured to be upright in the top-and-bottom direction, i.e., in a direction (Z-axis direction of the drawing) perpendicular to the bottom surface of the module case 102. The upper end portion of the heat absorbing plate S may be connected to the heat transfer member 103 and the lower end portion of the heat absorbing plate S may face the secondary battery 101. Further, the plurality of heat absorbing plates S may be provided for a heat transfer member 103. In this case, the plurality of heat absorbing plates S may be disposed at the center in the inner upper portion of the battery module 100. Alternatively, the plurality of heat absorbing plates S may be arranged more in the inner upper center portion than in the upper outer portion of the battery module 100.

In the embodiment of FIG. 19, the heat absorbing plate S is affixed to the main body of the heat transfer member 103, but the heat absorbing plate S may be configured such that a portion of the heat transfer member 103 is bent. For example, in the embodiment of FIG. 19, the center portion of the heat transfer member 103 may be bent in a downward direction to be exposed toward the secondary battery 101 from the upper inner surface of the module case 102. In addition, the heat absorbing plate S may be configured in other various shapes.

Meanwhile, in the present disclosure, various embodiments of the present disclosure have been described through various drawings and various descriptions. The embodiments may be employed in a combination of two or more, except when incompatible, even when there is no specific description. For example, the corrugated configurations of the bridge member 200 and/or the battery module 100 described with reference to FIG. 14 or 15 may be employed by the present disclosure in combination of at least one of the configurations described in the embodiments of FIGS. 16 through 18 or in the embodiments of FIGS. 1 through 13. As another example, the configuration of the expanding plate 242 of the bridge member 200 described with reference to FIG. 16 may be employed by the present disclosure in combination of at least one of the configurations described in the embodiments of FIGS. 17 and 18 and FIGS. 1 through 13. Similarly, the configurations described with reference to FIG. 17 or 18 may also be employed by the present disclosure in combination of several configurations described with reference to other drawings or the like of the present disclosure.

The battery pack according to the present disclosure may be applied to a vehicle, such as an electric vehicle or a hybrid electric vehicle. In other words, the vehicle according to the present disclosure may include the battery pack according to the present disclosure. In particular, in the electric vehicle or the like, the battery pack may include a plurality of secondary batteries, and heat generated in any secondary battery may be quickly discharged from the secondary battery or from the battery module 100 in which the secondary battery is included. Accordingly, a thermal runaway phenomenon or the like of the secondary battery or the battery module 100 may be effectively prevented. Moreover, the vehicle or the like is highly likely to be exposed to vibration or a strong impact. However, when the battery pack according to the present disclosure is applied, rigidity is stably secured despite the vibration or the impact, and thus occurrence of a warping phenomenon or the like of the battery pack may be effectively prevented.

Meanwhile, in the present disclosure, terms indicating directions, such as top, bottom, left, right, front, and back (rear) are used, but such terms are only for convenience of description and it would be obvious to one of ordinary skill in the art that the terms may vary according to a location of an object, a location of an observer, or the like.

While the present disclosure has been particularly shown and described with reference to exemplary embodiments thereof, it is to be understood that the disclosure is not limited to the exemplary embodiments. It will be apparent to those skilled in the art that various modifications and changes may be made without departing from the scope of the appended claims.

Explanation of Reference Numerals

100: Battery Module
101: Secondary Battery
102: Module Case
103: Heat Transfer Member
110: Bridge Mounting Portion
200: Bridge Member
201: Main Body
202: Cover
211: First Body Portion
212: Second Body Portion
213: Heat Blocking Portion
220: Cover Portion
231: Inserting Portion
232: Mounting Portion
241: Main Body
242: Expanding Plate
300: Heat Sink
D: Adhesive Material
C: Heat Absorbing Material
G: Sliding Groove
F: Groove
P: Protrusion
J1: Main Body Inserting Groove
J2: Slit
K: Containing Groove
S: Heat Absorbing Plate

What is claimed is:
1. A battery pack comprising:
a plurality of battery modules, each of the plurality of battery modules comprising at least one secondary battery therein and spaced apart from each other by a predetermined distance, the plurality of battery modules including a first battery module having a first side wall and a second battery module including a first side wall facing the first side wall of the first battery module; and a first bridge member comprising a heat conductive material and configured to receive heat generated from the first battery module, the first bridge member having a first end wall contacting the first side wall of the first battery module, a second end wall contacting the first side wall of the second battery module and at least one side wall extending between the first end wall and second end wall, wherein the first battery module comprises, at a region where the first bridge member is contacted, a bridge mounting portion extending outwardly from the first side wall and configured to support a lower surface of the at least one side wall of the first bridge member in an upward direction.

2. The battery pack of claim 1, wherein the first bridge member is configured to transfer the heat generated from the first battery module to the second battery module through the heat conductive material.

3. The battery pack of claim 1, further comprising a second bridge member,
wherein the first bridge member and the second bridge member are disposed between the first and second battery modules while being spaced apart from each other in a direction orthogonal to a stacking direction of the plurality of battery modules.

4. The battery pack of claim 1, wherein the first bridge member comprises an adhesive material at the first end wall and second end wall to be adhesively fixed to the first side wall of the first battery module and the first side wall of the second battery module, respectively.

5. The battery pack of claim 1, wherein the first bridge member comprises a heat absorbing material, and is configured to absorb and store the heat generated from the first battery module.

6. The battery pack of claim 5, wherein the first bridge member comprises an internal space and contains the heat absorbing material in the internal space.

7. The battery pack of claim 6, wherein the first bridge member is configured to allow replenishing or withdrawal of the heat absorbing material provided in the internal space.

8. The battery pack of claim 1, wherein the plurality of battery modules are arranged in a horizontal direction, and
wherein the first bridge member is disposed at an upper corner portion of the plurality of battery modules.

9. The battery pack of claim 1, wherein the first bridge member is configured to be detachable from the plurality of battery modules.

10. The battery pack of claim 1, wherein the first bridge member is configured to allow a coupling location with respect to an outer surface of the plurality of battery modules to be changeable.

11. The battery pack of claim 1, wherein the first end wall of the first bridge member has a non-planar surface and the first side wall of the first battery module has a recess in a mutually corresponding shape to the first end wall.

12. The battery pack of claim 1, wherein the at least one side wall of the first bridge member includes a top wall, and wherein the top wall extends beyond the end wall of the first bridge member and contacts an upper surface of the first battery module and an upper surface of the second battery module.

13. The battery pack of claim 1, further comprising a second bridge member attached to a second side wall of the first battery module,
wherein the first battery module further comprises a heat transfer member configured to transfer heat between the first bridge member and the second bridge member.

14. The battery pack of claim 13, further comprising a heat transfer plate contacting the heat transfer member.

15. A vehicle comprising the battery pack of claim 1.

16. The battery pack of claim 1, wherein the first bridge member is cylindrical.

17. A battery pack comprising:
a plurality of battery modules, each of the plurality of battery modules comprising at least one secondary battery therein and spaced apart from each other by a predetermined distance, the plurality of battery modules including a first battery module having a first side wall and a second battery module including a first side wall facing the first side wall of the first battery module;
a first bridge member comprising a heat conductive material and configured to receive heat generated from the first battery module, the first bridge member having a first end wall contacting the first side wall of the first battery module, a second end wall contacting the first side wall of the second battery module and at least one side wall extending between the first end wall and second end wall; and
a second bridge member attached to a second side wall of the first battery module,
wherein the first battery module further comprises a heat transfer member configured to transfer heat between the first bridge member and the second bridge member, and
wherein the heat transfer member extends through a top wall of the first battery module.

18. A battery pack comprising:
a plurality of battery modules, each of the plurality of battery modules comprising at least one secondary battery therein and spaced apart from each other by a predetermined distance, the plurality of battery modules including a first battery module having a first side wall and a second battery module including a first side wall facing the first side wall of the first battery module;
a first bridge member comprising a heat conductive material and configured to receive heat generated from the first battery module, the first bridge member having a first end wall contacting the first side wall of the first battery module, a second end wall contacting the first side wall of the second battery module and at least one side wall extending between the first end wall and second end wall;
a second bridge member attached to a second side wall of the first battery module; and
a heat transfer plate contacting the heat transfer member,
wherein the first battery module further comprises a heat transfer member configured to transfer heat between the first bridge member and the second bridge member, and
wherein the heat transfer member and heat transfer plate are in top wall of the first battery module.

* * * * *